United States Patent
Coker et al.

[11] Patent Number: 6,104,766
[45] Date of Patent: Aug. 15, 2000

[54] NOISE PREDICTIVE MAXIMUM LIKELIHOOD (NPML) DETECTION METHODS AND APPARATUS BASED THEREON

[75] Inventors: Jonathan Darrel Coker, Rochester, Minn.; Evangelos Stavros Eleftheriou, Zurich, Switzerland; Richard Leo Galbraith, Rochester, Minn.; Walter Hirt, Wettswil, Switzerland

[73] Assignee: International Business Machines Corporation, Armonk, N.Y.

[21] Appl. No.: 08/715,174

[22] Filed: Sep. 17, 1996

[30] Foreign Application Priority Data

Sep. 18, 1995 [CH] Switzerland ............. PCT/IB95/00769

[51] Int. Cl.$^7$ ....................................... H03D 1/00
[52] U.S. Cl. .................. 375/341; 375/232; 375/262; 375/263; 714/794
[58] Field of Search ................ 324/76.28, 76.29; 342/203–204; 375/231–233, 327, 341, 350, 367, 262, 263, 265; 360/39, 40, 55, 65; 714/794

[56] References Cited

U.S. PATENT DOCUMENTS

| | | | |
|---|---|---|---|
| 4,571,734 | 2/1986 | Dolivo et al. | 375/18 |
| 4,631,735 | 12/1986 | Qureshi | 375/34 |
| 4,707,681 | 11/1987 | Eggenberger et al. | 340/347 DD |
| 4,713,829 | 12/1987 | Eyuboglu | 375/37 |

(List continued on next page.)

FOREIGN PATENT DOCUMENTS

| | | | |
|---|---|---|---|
| 5-7128 | 1/1993 | Japan | H03H 17/00 |
| 6-20208 | 1/1994 | Japan | G11B 5/09 |
| 2286952 | 6/1995 | United Kingdom . | |
| WO94/29989 | 12/1994 | WIPO | H04L 25/03 |

OTHER PUBLICATIONS

G. D. Forney, "Maximum–Likelihood Estimation Of digital Sequences In The Presence Of Intersymbol Interference," IEEE Trans. Inform Theory, vol. IT–18, No. 3, May 1972, pp. 363–378.

P. R. Chevillat et al., Noise Predictive Partial–Response Equalizers And Applications, IEEE Conf. Records, ICC'92, Jun. 14–18, 1992, pp. 0942–0947.

(List continued on next page.)

Primary Examiner—Stephen Chin
Assistant Examiner—Chieh M. Fan
Attorney, Agent, or Firm—G. Marlin Knight

[57] ABSTRACT

The invention is family of noise predictive maximum likli-hood (NPML) symbol detectors that are particularly useful in direct access storage devices. Various embodiments representative of the family of detectors are described. In general, the NPML detectors include a sequence detector with imbedded feedback which may be preceded by a filter, e.g., a prediction error filter. The sequence of detectors, which may be Viterbi detectors, have an imbedded filter whose coefficients are determined by the convolution of the partial response (PR) or generalized PR function with the predictor coefficients and do not require multiplications and, thus, allows a simple RAM look-up for intersymbol-interference ISI cancelation. In one class of embodiments, the NPML detector comprises a prediction error filter of length N, cascaded with a sequence detector having $2^K$ states, and a feedback filter imbedded in the sequence detector, having a length N+P−K, where P is length of the generalized PR shaping polynomial (P=2 yields PR4), and $0 \leq K \leq N+P$.

30 Claims, 27 Drawing Sheets

U.S. PATENT DOCUMENTS

| | | | |
|---|---|---|---|
| 4,786,890 | 11/1988 | Marcus et al. | 341/81 |
| 4,833,693 | 5/1989 | Eyuboglu | 375/34 |
| 4,866,736 | 9/1989 | Bergmans | 375/18 |
| 5,003,555 | 3/1991 | Bergmans | 375/233 |
| 5,031,195 | 7/1991 | Chevillat et al. | 375/14 |
| 5,196,849 | 3/1993 | Galbraith | 341/59 |
| 5,220,466 | 6/1993 | Coker et al. | 360/46 |
| 5,258,940 | 11/1993 | Coker et al. | 364/724.16 |
| 5,285,480 | 2/1994 | Chennakeshu et al. | 375/101 |
| 5,341,387 | 8/1994 | Nguyen | 371/45 |
| 5,357,520 | 10/1994 | Arnett et al. | 371/21.2 |
| 5,422,760 | 6/1995 | Abbott et al. | 360/46 |
| 5,440,588 | 8/1995 | Murakami | 375/341 |
| 5,453,797 | 9/1995 | Nicolas et al. | 348/607 |
| 5,486,956 | 1/1996 | Urata | 360/65 |
| 5,513,216 | 4/1996 | Gadot et al. | 375/233 |
| 5,546,430 | 8/1996 | Liao et al. | 375/341 |
| 5,588,011 | 12/1996 | Riggle | 371/43 |
| 5,734,680 | 3/1998 | Moore et al. | 375/263 |
| 5,768,320 | 6/1998 | Kovacs et al. | 375/341 |
| 5,822,143 | 10/1998 | Cloke et al. | 360/65 |

OTHER PUBLICATIONS

R. D. Cideciyan et al., "A PRML System For Digital Magnetic Recording," IEEE Journal on Selected Areas In Communications, vol. 10, No. 1, Jan. 1992, pp. 38–56.

A. P. Hekstra, "An Alternative To Metric Rescaling In Viterbi Decoders," IEEE Transactions on Communications, vol. 37, No. 11, Nov. 1989, pp. 1220–1222.

A. H. Shakiba et al., "Analog Implementation Of Class–IV Partial–Response Viterbi Detector," Proc. ISCAS'94, 1994.

A. Eshraghi et al., "Design Of A New Squaring Function for The Viterbi Algorithm," IEEE Journal of Solid State Circuits, vol. 29, No. 9, Sep. 1994, pp. 1102–1107.

T. Wang et al., "Improved Adaptive Decision–Feedback Equalization With Interleaving For Coded Modulation Systems", Proceedings Of The Global Telecommunications Conference (GLOBECOM), San Francisco, Nov. 28–Dec. 2, 1994, vol. 1 of 3, Nov. 28, 1994, pp. 6–10, IEEE.

D. W. Lin et al., "Receiver Optimization For Dispersive Channels Employing Coded Modulation, With Application In High Rate Digital Subscriber Line Transmission," ICC'90, Atlanta, Apr. 15–19, 1990, vol. 4 of 4, Apr. 15, 1990, pp. 1742–1746 IEEE.

NOISE PREDICTIVE MAXIMUM LIKELIHOOD (NPML) DETECTION METHODS AND APPARATUS BASED THEREON

TECHNICAL FIELD

The invention relates to data detection methods and apparatus, particularly methods and apparatus for partial-response signaling and maximum likelihood sequence detection. It further relates to direct access storage devices (DASDs) based on these methods.

BACKGROUND OF THE INVENTION

Application of partial-response (PR) class-IV (PR4) equalization and maximum likelihood sequence detection (MLSD) has been shown in theory and practice to achieve near optimal performance at recording densities of 0.8<PW50/T<1.6, where PW50 is the pulse width at the 50% amplitude point of the channel's step response and T is the duration of the channel encoded bit. A partial response maximum likelihood (PRML) system for the magnetic recording channel has been described in "A PRML system for Digital Magnetic Recording," Roy D. Cideciyan et al., IEEE Journal on Selected Areas in Communications, Vol. 10, No. 1, pp. 38–56, January 1992. In the U.S. Pat. No. 4,786,890 a class-IV PRML channel using a run-length limited (RLL) code has also been disclosed.

At high recording densities, i.e., PW50/T>1.6, the linear partial response class-IV equalizer leads to substantial noise enhancement. As a consequence, the performance of the PRML detector suffers and may become inadequate to meet product specifications. Application of extended partial-response maximum likelihood (EPRML) detectors has been shown in theory and practice to achieve better performance than PRML detectors in the range PW50/T>1.6. The patent application GB-A-2286952, published on Aug. 30, 1995, discloses a novel EPRML scheme for data detection in a direct access storage device. The novel architecture of the invention claimed therein allows for the addition of EPRML detectors to PRML channels with only minor changes to the overall channel architecture.

The optimum MLSD receiver for detecting an uncoded data sequence in the presence of intersymbol-interference (ISI) and additive Gaussian noise consists of a whitened-matched filter followed by a Viterbi detector which performs maximum likelihood sequence detection on the ISI trellis, as described by G. D. Forney in "Maximum-likelihood sequence estimation of digital sequences in the presence of intersymbol interference," IEEE Trans. Inform. Theory, Vol. IT-18, No. 3, pp. 363–378, May 1972. For the magnetic recording channel the state complexity of this trellis is given by $2^L$ where L represents the number of relevant ISI terms in the output signal of the whitened-matched filter. In the patent application WO94/29989 with title "Adaptive noise-predictive partial-response equalizing for channels with spectral nulls," filed Jun. 14, 1993 and published Dec. 22, 1994, and in reference "Noise predictive partial-response equalizers and applications," P. R. Chevillat et al., IEEE Conf. Records ICC'92, Jun. 14–18 1992, pp. 0942–0947, it was shown that a partial-response zero forcing equalizer cascaded with a linear predictor whose coefficients have been suitably chosen, is equivalent to the whitening discrete-time prefilter of the optimum MLSD receiver. Furthermore, in the same patent application a receiver structure has been disclosed where the prediction process has been imbedded in the Viterbi detector corresponding to the partial-response trellis. The above patent application WO94/29989 is primarily concerned with wire transmission systems.

In the above patent application WO94/29989 and the article of P. R. Chevillat et al. it has been concluded that noise-prediction in conjunction with PRML improves detector performance.

It is an object of the present invention to provide a method and apparatus with improved data detection performance.

SUMMARY OF THE INVENTION

It is an object of the present invention to provide a method and apparatus for improved data detection in direct access storage devices with the purpose to overcome the performance problems in prior art schemes.

It is an object of the present invention to provide a method and apparatus to achieve higher linear storage density in direct access storage devices (DASDs).

It is another object of the present invention to provide a method and apparatus which can be employed in a conventional PRML/EPRML direct access storage device without changing the principal architecture of the electronic channel.

The above objects have been accomplished by providing an entire family of estimation detectors which can for example be used for data detection in DASDs. Some of the present detectors, which make specific use of properties of the magnetic recording channel, arise by imbedding a noise prediction/whitening process into the branch metric computation of the maximum-likelihood sequence detector and are collectively called Noise Predictive Maximum Likelihood (NPML) detectors. They furthermore comprise means for cancellation of intersymbol-interference (ISI) components by an appropriate look-up table. In contrast to the patent application WO94/29989 and the article of P. R. Chevillat et al. where the state complexity of the detector is fixed and determined by the partial-response trellis, the NPML detectors have a state complexity which is equal to $2^K$, where $0 \leq K \leq L$ and L reflects the number of controlled (known) Intersymbol Interference (ISI) components introduced by the combination of PR equalizer and predictor. The special case where K=L is equivalent to the optimum MLSD detector for the given predictor length and the special case K=0 corresponds to a noise-predictive PR equalizer followed by a memoryless detector. For $1 \leq K \leq L$ the NPML detector operates on a reduced set of ISI states. At the same time, the (L−K) ISI terms (components) not represented in the state-space of the NPML detector are compensated in a decision-feedback fashion by using decisions from the path history. Thus, the NPML detectors offer a trade-off between performance and state complexity and/or length of decision-feedback and they provide a substantial gain in linear recording density over PRML and EPRML detectors. In addition, the present implementations of NPML detectors do not require multiplications in the imbedded predictor and thus allow simple random access memory (RAM) look-up implementation for ISI cancellation. Furthermore, NPML detectors generally do not exhibit quasi-catastrophic error propagation. Thus, additional increases in recording density can be achieved with higher rate run-length limited (RLL) codes by relaxing the constraints relating to the survivor path memory. Finally, besides modularity and substantial gains in performance, the NPML detectors have the important implementation advantage that they can be "piggy-backed" on existing PRML/EPRML systems. Therefore, there is no need for the development and implementation of an entirely new channel architecture which is a costly and complex task.

Also described and claimed are low complexity derivatives of the NPML detector family which offer appreciable performance gains. The respective schemes include, but are not limited to, two-state interleaved NPML detectors and cascaded noise-predictors with PRMl detectors. Furthermore, derived from an NPML scheme with a single-tap predictor, a programmable 8-state NPML detector is described which is capable to operate also as a PRML or EPRML detector.

DESCRIPTION OF THE DRAWINGS AND NOTATIONS USED

The invention is described in detail below with reference to the following drawings:

FIG. 1 Shows a block diagram used to illustrate how the inventive NPML detectors fit into the existing PRML channel architecture.

FIG. 2A Shows the blocks of FIG. 1 which are relevant for the present invention: the digital equalizer 22, the present NPML detector 10, and inverse precoder 23.

DESCRIPTION OF THE PREFERRED EMBODIMENTS

In the following, the principal forms of implementation of NPML Detectors are described.

Figure 1:
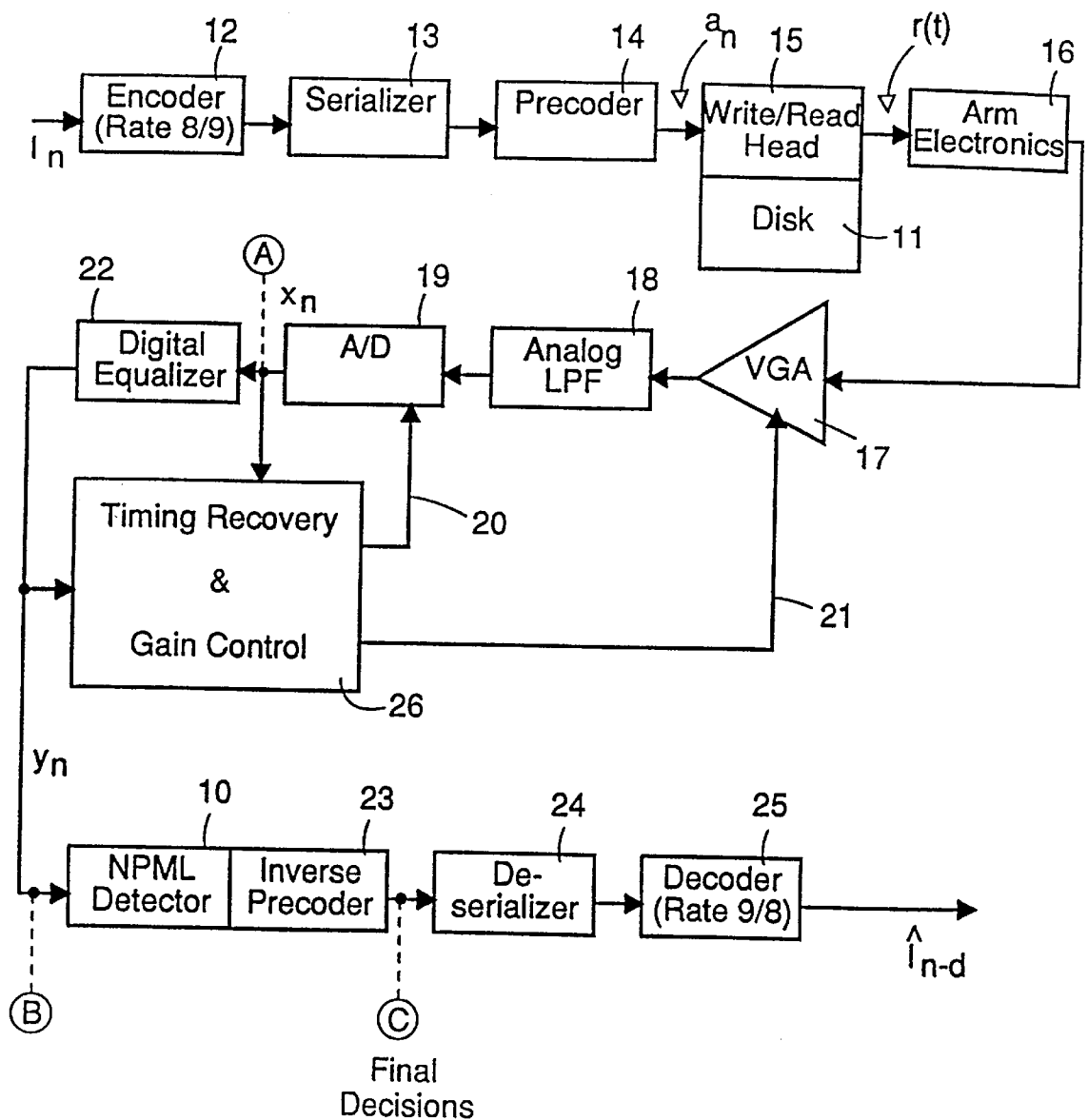
Figure 2A:
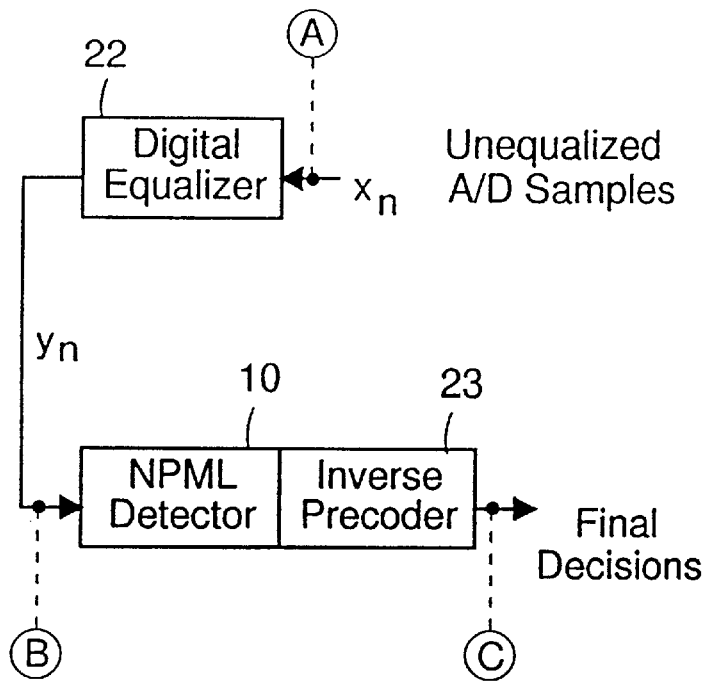
FIG. 2B Shows an equivalent form of the present NPML detector 10, according to the present invention.
FIG. 2C Shows another equivalent, more detailed, form of the present NPML detector 10, according to the present invention.
FIG. 2D Shows yet another equivalent form of the present NPMI detector 10, according to the present invention.
FIG. 2E Shows another possible embodiment of a sequence detector with imbedded feedback, according to the present invention.

The block diagram in FIG. 1 shows how the present NPML detectors 10 fit into the existing PRML channel architecture. Customer data $I_n$ are written in the form of binary digits $a_n \in \{-1, +1\}$ by write head 15 on the disk 11 after being encoded in an encoder 12 by a rate-8/9 RLL code, serialized in a serializer 13 and precoded in a precoder 14 by a $1/(1 \oplus D^2)$ operation where D is the unit delay operator. When retrieving the customer data from said disk 11, an analog signal r(t) is generated by the read head 15 and provided at the read-head's output. This signal r(t) is then applied via the arm electronics 16 to a variable-gain amplifier (VGA) circuit 17. The output signal of the VGA circuit 17 is first low-pass filtered using an analog low-pass filter 18 (LPF) and then converted to a digital form $x_n$ by an analog-to-digital (A/D) converter 19. The functions of the A/D converter 19 and VGA unit 17 are controlled by the timing recovery and gain control loops 20 and 21, respectively. The analog low-pass filter 18 is preferably a filter which boosts the higher frequencies to avoid saturation of the A/D converter 19. The digital samples x, at the output of the A/D converter 19 (line labeled A in FIG. 1) are first shaped to PR4 signal samples by the digital equalizer 22 (line labeled B in FIG. 1) and are then passed on to the inventive NPML detector in the form of digital samples $y_n$. After inverse preceding by means of a precoder 23 performing a $(1 \oplus D^2)$ operation, the output data of the NPML detector 10 (i.e. the final decisions; line labeled C in FIG. 1) are fed via a deserializer 24 to a decoder 25 for the rate-8/9 RLL code which delivers the retrieved customer data $\hat{I}_{n-d}$. The inverse precoder function following the NPML detector in FIG. 1 can be a separate functional block (as shown) or it can be imbedded in the trellis (survivor path memory) of the detector. FIG. 2A shows the blocks in FIG. 1 which are relevant for the present invention: the digital equalizer 22, the NPML detector 10, and the inverse precoder 23.

Generally, the coefficients of the digital equalizer 22 can be optimized so that the overall transfer function, including the head/disk-medium characteristics and the analog LPF 18, closely matches any desired system polynomial of the generalized partial-response form $f(D)=(1+f_1 D' + \ldots + f_p D^P)$ where the coefficients $f_i$ can be arbitrary real numbers. For example, the partial-response (PR) polynomial for class-4 PR systems (PR4) is $f(D)=(1-D^2)$. Similarly, the polynomial for extended partial-response class-4 (EPR4) systems is $f(D)=(1-D^2)(1+D)=(1+D-D^2-D^3)$. A further example is $f(D)=(1-0.1D-0.9D^2)$.

Figure 2B:
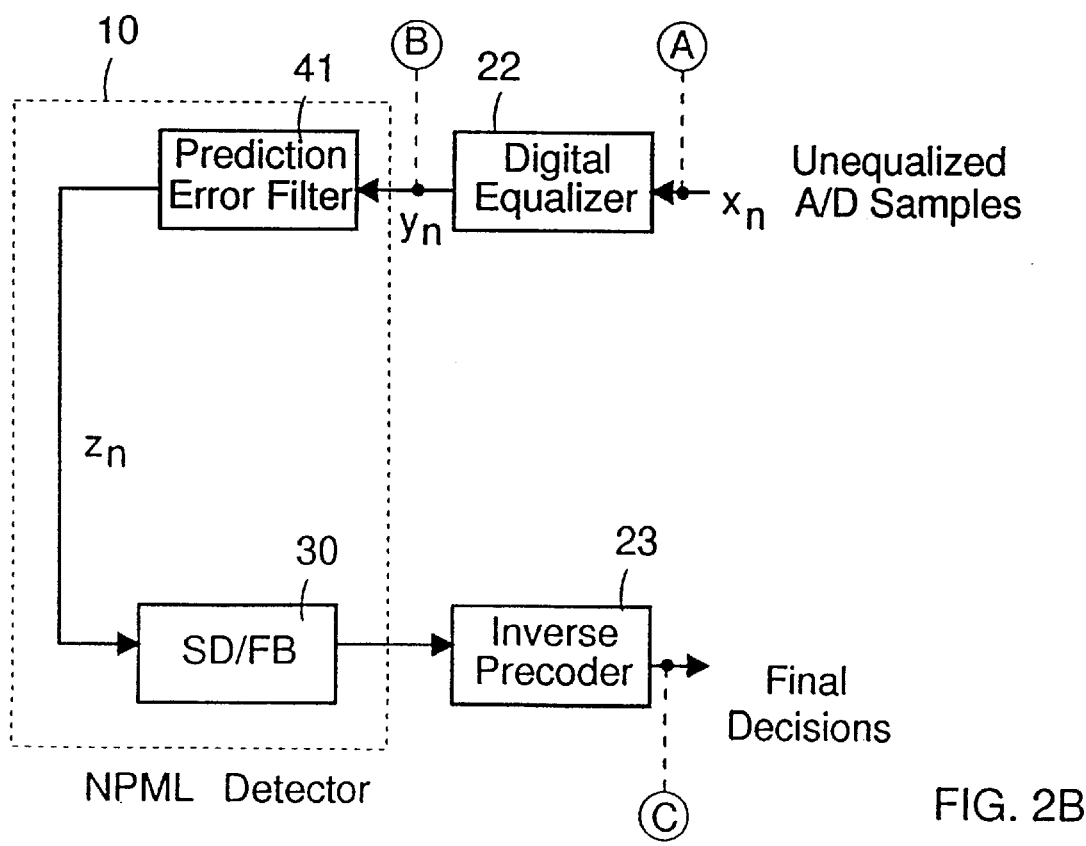

FIG. 2B shows the basic structure of the NPML detector 10 in the form of a prediction error filter 41 cascaded with a sequence detector (SD) with imbedded feedback (FB) 30.

In the sequel we use PR4- equalized signals $y_n$ (Line B in FIG. 2B), however, the inventive scheme can be applied to any shaping performed by the equalizer 22 in FIGS. 2A and 2B.

Figure 2C:
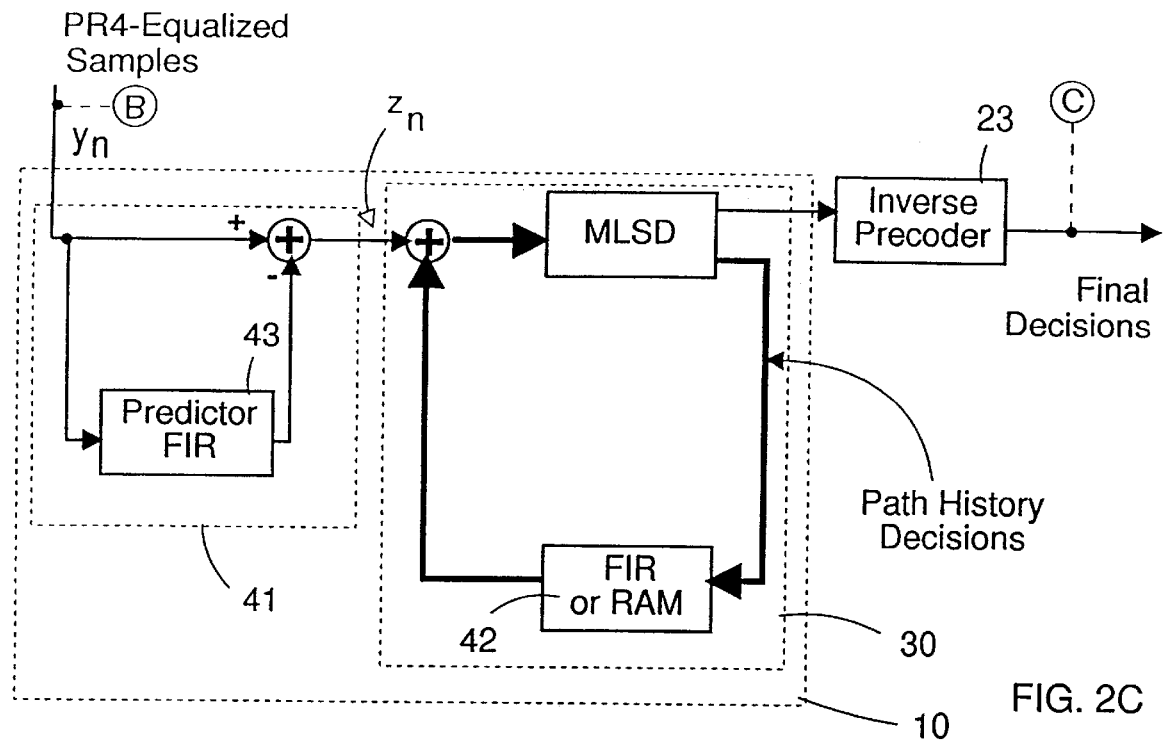
Figure 2D:
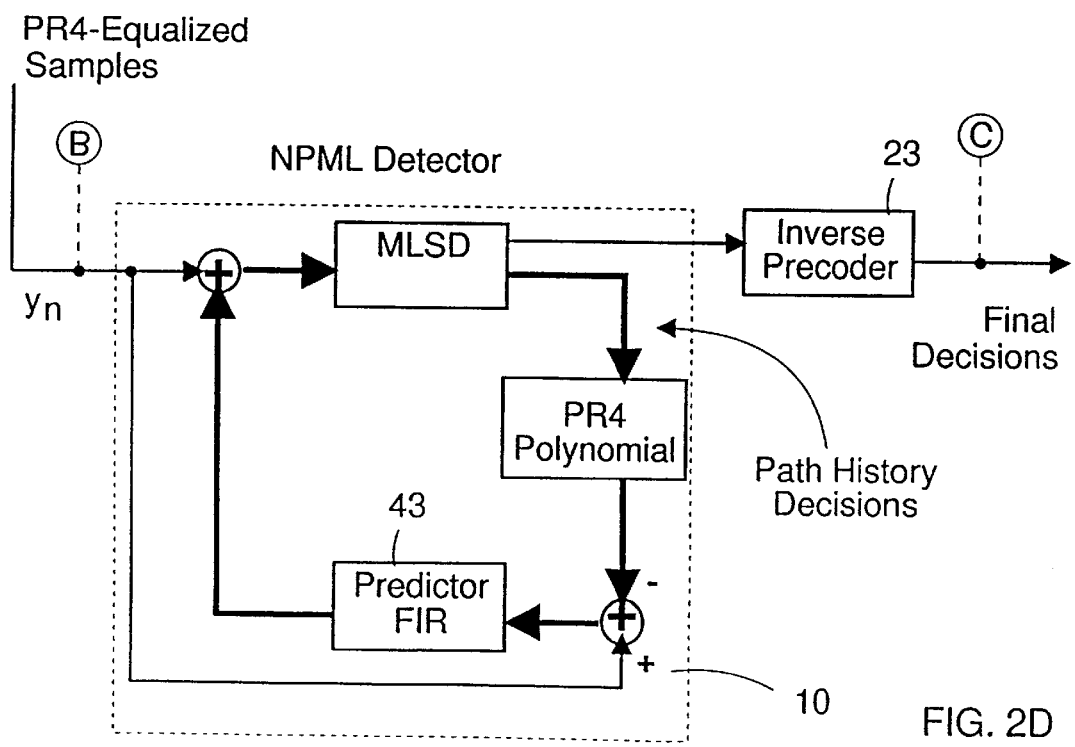

FIGS. 2C and 2D show two equivalent forms of NPML detectors, according to the present invention. Its basic principle can be explained as follows. Let $y_n$ be the output of the PR4 digital equalizer (line labeled B in FIGS. 1, 2C and 2D). This output then consists of a PR4 data signal and colored noise (colored interference components), i.e., $$y_n = a_n - a_{n-2} + w_n \quad (1)$$

where $a_n \in \{-1, +1\}$ denotes the encoded/precoded data sequence written on the magnetic medium with a rate 1/T and $w_n$ represents the colored noise sequence at the output of the digital equalizer 22. The power of the colored noise component (colored interference component) can be reduced by noise prediction. If $p(D) = (p_1 D^1 + p_2 D^2 + \ldots + p_N D^N)$ denotes the transfer polynomial, or equivalently $E(D) = 1 - P(D)$ denotes the transfer polynomial of the prediction error filter, of the N-tap minimum mean-square (MMSE) predictor of the noise sample $w_n$ then the signal $$e_n = w_n - \hat{w}_n \quad (2)$$

$$= w_n - \sum_{i=1}^{N} w_{n-i} p_i$$

$$= (y_n - a_n + a_{n-2}) - \sum_{i=1}^{N} (y_{n-i} - a_{n-i} + a_{n-i-2}) p_i$$

represents the prediction error or equivalently the whitened noise component of the PR4-equalized output signal $y_n$. Reliable operation of the prediction/whitening process is possible by using decisions from the path history associated with each state which is available in a sequence (Viterbi) detector. In that sense, NPML detectors are MLSD detectors for (PR) signals with imbedded prediction or equivalently imbedded feedback.

In view of (1) and (2) the branch metric of the NPML detector 10 for PR4-equalized samples corresponding to a transition from state $s_j$ to state $s_k$ takes the form $$\lambda(s_j, s_k) = \left| y_n - \sum_{i=1}^{N} (y_{n-i} - a_{n-i}(s_j) + a_{n-i-2}(s_j)) p_i - a_n + a_{n-2} \right|^2 \quad (3)$$

where the terms $a_{n-i}(s_j)$, $a_{n-i-2}(s_j)$ represent past decisions taken from the path history associated with state $s_j$, and $a_n$, $a_{n-2}$ are determined by the hypothesized state transition $s_j \rightarrow s_k$. Clearly, the noise prediction process appears explicitly in the branch metric computation of the Viterbi algorithm implementing the NPML detector. Furthermore, it can be seen that by setting the predictor coefficients $p_i$ equal to zero, the branch metric in (3) becomes the branch metric of the 4-state PRML detector.

The branch metric in (3) can also be written as $$\lambda(s_j, s_k) = \left| y_n - \sum_{i=1}^{N} y_{n-i} p_i + \sum_{i=1}^{N} (a_{n-i}(s_j) - a_{n-i-2}(s_j)) p_i - a_n + a_{n-2} \right|^2 \quad (4)$$

By noticing that the first sum in (4) is state independent, and after some rearrangement of the remaining terms, the equivalent branch metric is obtained as $$\lambda(s_j, s_k) = \left| z_n + \sum_{i=K+1}^{N+2} a_{n-i}(s_j) g_i + \sum_{i=1}^{K} a_{n-i} g_i - a_n \right|^2 \quad (5)$$

where the signal sample $$z_n = y_n - \sum_{i=1}^{N} y_{n-i} p_i$$

is the output of the prediction error filter 41, shown in the equivalent NPML implementation of FIG. 2C, and $\{g_i, i=1, 2, \ldots, N+2\}$ are the coefficients of the imbedded feedback filter 42 (FIR: finite impulse response or RAM-based filter) in FIG. 2C. It can be shown that the coefficients $\{g_i, i=1, 2, \ldots, N+2\}$ introduced in (5) are the coefficients of the polynomial $g(D)=(+1-g_1 D^1-g_2 D^2-\ldots-g_{n+2} D^{N+2})=(1-D^2)(1-P(D))=(1-D^2)E(D)$. The effective ISI memory L of the PR4-based NPML system is thus L=N+2. The symbols $a_{n-i}(s_j)$ in the first summation term of (5) represent past decisions taken from the path history associated with state $s_j$, whereas the symbols $a_{n-i}$ in the second summation term of (5) represent state information. Clearly, by increasing K we effectively increase the number of states of the NPML detector and decrease the length of the imbedded decision feedback. Conversely, by decreasing K the number of states is decreased at the expense of increasing the length of the imbedded decision feedback. Thus, the emerging family of NPML detectors, in accordance with the present invention, offers a trade-off between state complexity and length of imbedded decision feedback.

The two equivalent implementations of the NPML detector 10 shown in FIGS. 2C and 2D, respectively, require no change of the signal processing blocks, i.e., VGA 17, analog LPF 18, digital equalizer 22, timing recovery and gain control loops 20 and 21, of the current PRML/EPRML channel architecture used by IBM and others. Any member of the family of NPML detectors according to the present invention can either replace the PRML/EPRML detector or operate concurrently with it.

Figure 2E:
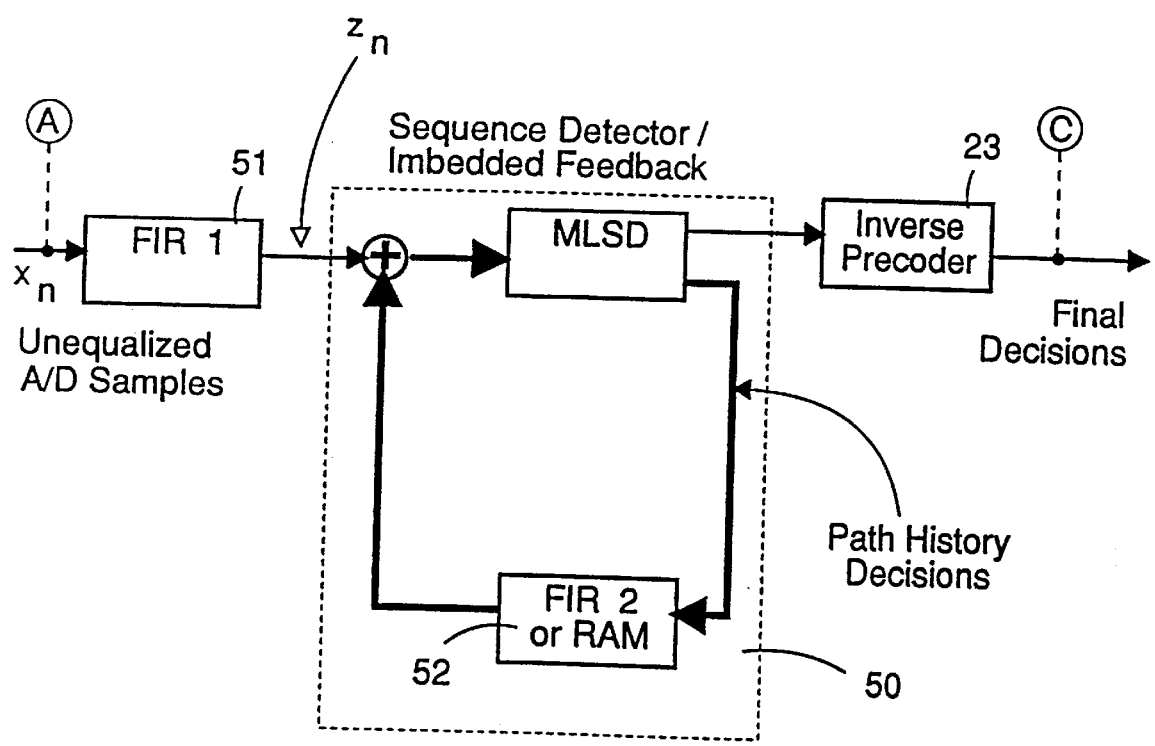

A third possible implementation of an NPML scheme in the form of a filter cascaded with a sequence detector with imbedded feedback is shown in FIG. 2E. In this case the combination of digital equalizer 22 and prediction error filter 41 (see FIG. 2B) is replaced by a single finite-impulse response filter designated as FIR1 51. Input to the filter FIR1 51 now are the unequalized samples x, at the output of the A/D converter 19 (line labeled A in FIGS. 1 and 2E). The filter FIR1 51 has the property to whiten the noise and introduce a controlled amount of ISI in the signal samples $z_n$ at its output. The coefficients of the feedback filter (FIR2 or RAM 52) are then used in the branch metric computation of the sequence detector with imbedded feedback in the same way described above. Thus, the branch metric takes the form $$\lambda(s_j, s_k) = \left| z_n + \sum_{i=K+1}^{N+2} a_{n-i}(s_j) b_i + \sum_{i=1}^{K} a_{n-i} b_i - a_n \right|^2 \quad (6)$$

where $z_n$ is the output of FIR1 51 and $\{b_i, i=1, 2, \ldots, N+2\}$ is the set of coefficients of the filter FIR2 52. Note that expressions (5) and (6) are essentially the same. It can be shown that for infinitely long filters the three alternative implementations of sequence detection with imbedded feedback, shown in FIGS. 2A–2E, are equivalent.

It should be understood that the NPML principles described hereinabove can be applied to any form of system polynomial f(D). In the sequel, however, only the PR class-IV polynomial (PR4) will be considered as the target polynomial.

Performance and Preferred Parameters for NPML Detectors Used in DASD's

The error performance of a magnetic recording system employing NPML detection has been studied by computer simulations in order to determine the appropriate parameters N (number of predictor coefficients) and K (length of detector memory defining the number of detector states $2^K$) to be used in a practical system. In particular, the cases described in this document for N=1, N=2, and N=4 predictor coefficients lead to preferred NPML detectors.

Figure 3A:
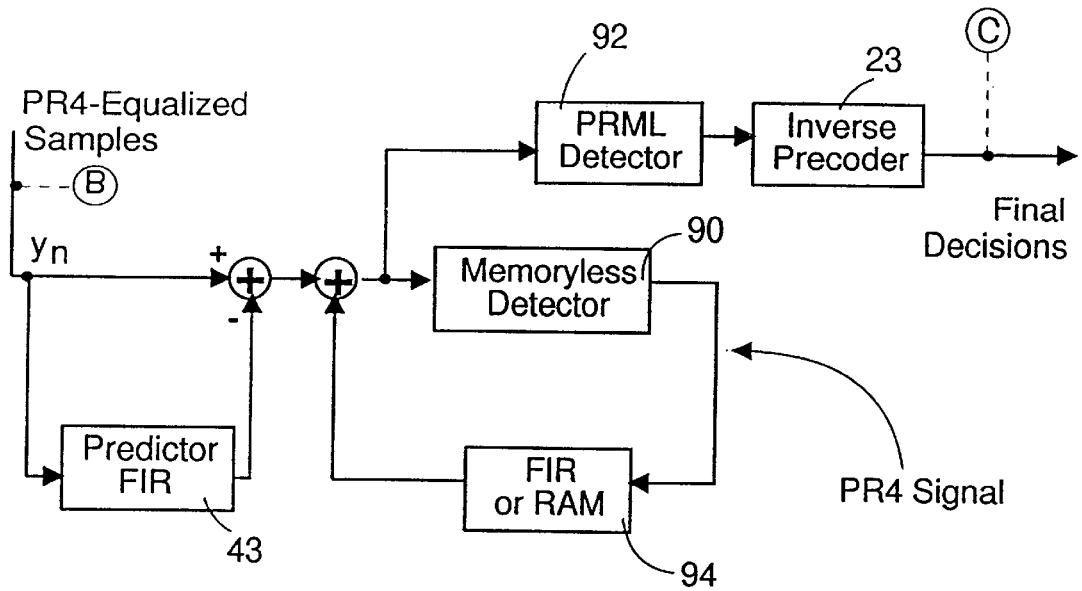
FIG. 3A Shows the noise-predictive part using a memoryless detector in cascade with a conventional PRML detector, according to the present invention.
Figure 3B:
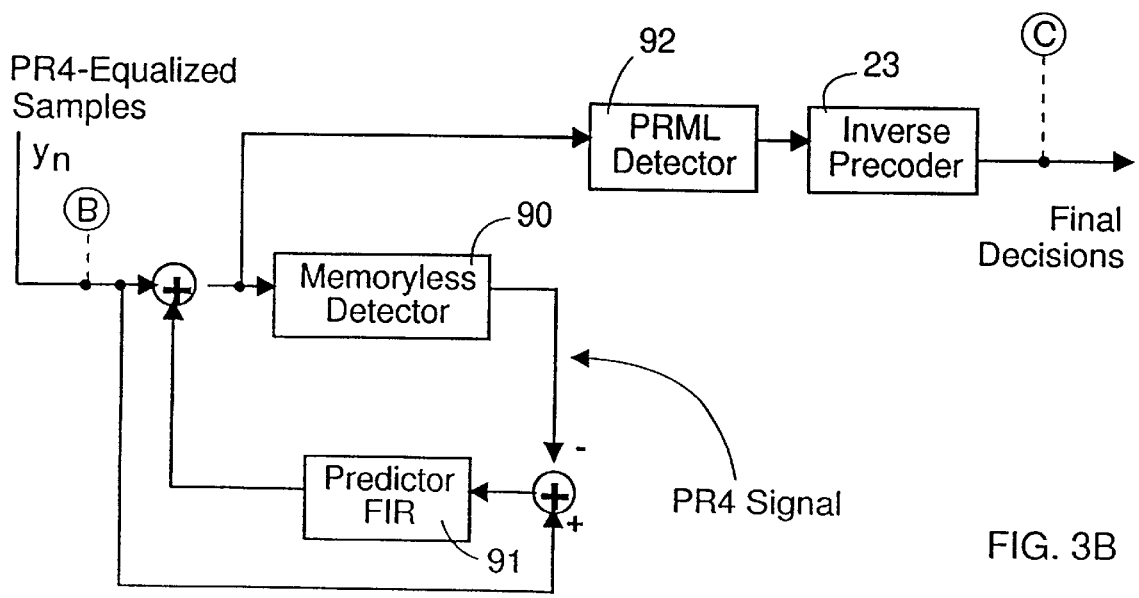
FIG. 3B Shows another approach to realize the noise-predictive part using a memoryless detector in cascade with a conventional PRML detector, according to the present invention.

Two low-complexity derivatives of the NPML detector family have also been investigated. Both schemes, like the entire family of NPML detectors, require no change of the signal processing parts of the current PRML channel architecture (see also FIG. 1). FIG. 3A shows the noise-predictive part using a memoryless detector in cascade with a conventional PRML detector. The colored noise component of the PR4-equalized signal (line labeled B in FIGS. 1 and 3A) is first whitened by a predictor. Note that instead of imbedding the predictor into the MLSD process, a 3-level (+2, 0, −2) memoryless detector provides the (tentative) PR4 (signal sample) decisions needed for the whitening process. The PR4-equalized samples corrupted with the whitened noise components are then fed to a conventional PRML detector and inverse precoder to obtain improved final decisions. FIG. 3B is an equivalent form of the scheme in FIG. 3A similar to the equivalent forms in FIGS. 2C and 2D, respectively.

The second low-complexity NPML detector scheme is based on the fact that PR4 sequences can be viewed as two independent, interleaved dicode sequences with polynomial (1−D'), where D' refers to a delay of 2T. In this case each dicode sequence at the output of the digital equalizer (line labeled B in FIGS. 1, 2C, and 2D) can be described by a 2-state trellis. The Viterbi algorithm, operating separately on each of these 2-state interleaved trellises, will use the branch metrics given in (3) or (5) where the time indices are either even or odd. For example, while the Viterbi algorithm operates on the even trellis, the time indices of the branch metric expression (3) or (5) will be even whereas the contribution of the odd past decisions in whitening the noise will come from the path memory with the best metric of the odd trellis.

A further suboptimal scheme is to find the state with the best metric, compute the predictor output using the decisions from the survivor path corresponding to this best state, and applying it as a feedback term in the metric update computations for all states. This approach has the advantage that only a single RAM is needed.

Concept of NPML Detectors with Nonlinear Predictors

The NPML concept described herein is also applicable when the noise predictor has certain nonlinear characteristics and/or the computation of the predictor coefficients is based on a different noise model.

The present NPML architecture allows for great flexibility in optimizing the noise predictor function with respect to various kinds of random noise which occur in a practical target system. For example, only a portion of the total noise in hard disk drives is adequately modelled by additive white Gaussian noise (AWGN). Besides AWGN, the total noise includes other noise sources, such as signal-dependent disk noise, noise due to texture scratches, and so forth. In addition, to a certain extent coherent interference, such as clock and/or adjacent track signals, may also exist in the analog readback signal.

Because the NPML concept allows, in effect, the transfer function for the signal portion of the input to be different than that for the noise and other interference components also present in the signal, the predictor may be optimized to minimize signal disturbances due to any type of corruptive source. Conventional detectors (such as PRML and EPRML detectors, etc.) are only optimized to the extent that the signal disturbance at the detector input is additive, random, uncorrelated and Gaussian. This is often a poor approximation in practical DASD systems; thus, using a linear predictor and/or computing the predictor coefficients based on this idealistic noise model may not lead to optimal solutions in situations where this assumption is poorly matched.

In hard disk drives, both AWGN and so-called "disk noise" are dominant sources of readback signal corruption. In the following, an example is given for a linear noise predictor with four coefficients (N=4) where the coefficients have been computed by incorporating AWGN as well as disk noise in the noise statistics. A simple model of disk noise is the so-called "transition jitter model" wherein the deviation of each written transition from its nominal location is a random variable. The effective SNR achieved at the input of a PRML detector is 15.4 dB and at the input of a 64-state NPML detector 18.9 dB for AWGN alone for a channel operating at PW50/T=3. In case of AWGN combined with disk noise (transition jitter) the effective SNR at the input of a PRML detector is 12.7 dB and at the input of a 64-state NPML detector 15.5 dB for a channel operating at PW50/T=3. It is interesting to note that the NPML detector is able to adapt the predictor coefficients to different noise statistics and thus to maintain an SNR margin of 2.8–3.5 dB over PRML.

Although this example uses a 4-tap linear noise predictor for NPML, this technique and its benefits is herein claimed for all possible types of noise predictors, including nonlinear predictors.

Examples of Preferred Embodiments of NPML Detectors

Figure 4:
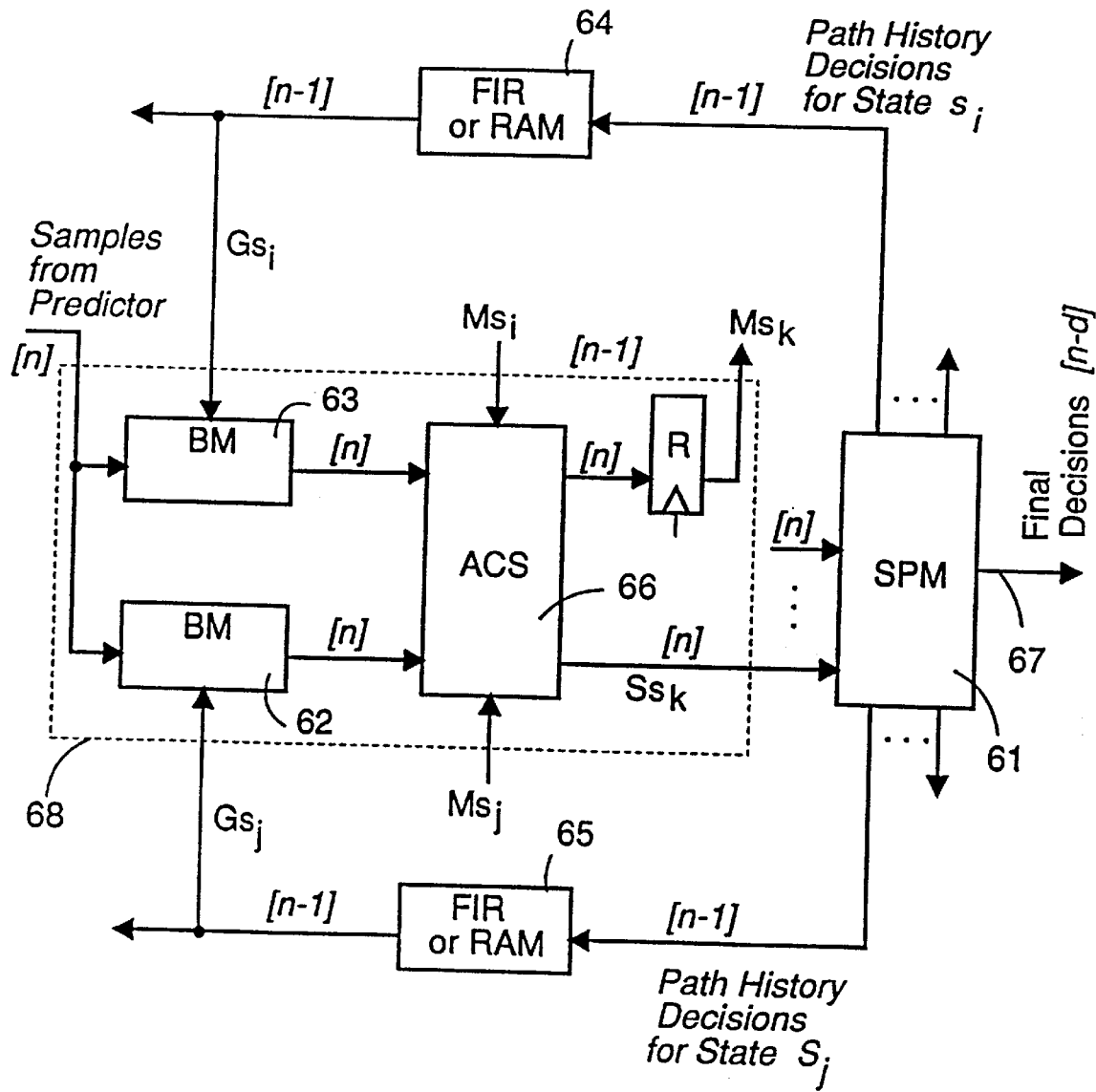
FIG. 4 Shows a block diagram to illustrate the operation of the metric update unit (MUU), for some state $s_k$ at the time nT, according to the present invention. MMUs are major functional blocks in an NPML detector.

The preferred form of implementation of an NPML detector within a PRML system is the one given in FIG. 2C. More details on this embodiment of an NPML detector 10 are given in this section. FIG. 4 illustrates the operation of a major functional block in an NPML detector according to FIG. 2C—the metric update unit (MUU) 68 shown here for state $s_k$ at time nT. FIG. 4 illustrates the required time relations between inputs and outputs of the various functional blocks. A separate MUU function must be provided for each hypothesized state $s_k$, k=1, 2, ..., $2^K$, where K∈{1, 2, ..., L} and L is the number of controlled ISI terms, e.g. for PR4 L=N+2. In high-performance DASDs parallel MUU hardware must be provided for each state to meet the data throughput requirements; in principle, however, hardware could be shared if speed constraints permit. Furthermore, it is assumed here and hereafter that the survivor path memory (SPM) 61, as shown for example in FIG. 4, is Implemented by using the register-exchange method, as for example described in the patent application GB-A-2286952, published on Aug. 30, 1995.

The branch metric (BM) units in a conventional MLSD (Viterbi) detector require only signal sample inputs, obtained directly from the equalizer (signal labeled B in FIG. 2C). As indicated in FIG. 4, it is a distinguished feature of the NPML detectors with K<L that each BM unit 62, 63 requires signal samples processed by a predictor 41 (signal labeled $z_n$ in FIG. 2C), as well as an additional input from FIR or RAM-based filters 64, 65 (signals $Gs_i$ and $Gs_j$ in FIG. 4) in the feedback path between the SPM 61 and the MUU 68. Note that the feedback filters 64, 65 do not have a common serial input, but they are loaded in parallel at every symbol interval T. The input of each FIR or RAM-based filter 64, 65 is a set of most recent past decisions taken from the survivor path history stored in the SPM 61 for each hypothesized state (i.e., $s_i$ and $s_j$, respectively, in FIG. 4). The add-compare-select (ACS) unit 66 in FIG. 4 adds the branch metrics to the state metrics $Ms_i$ and $Ms_j$, respectively, compares the results, selects the survivor metric $Ms_k$ and provides the update signal $Ss_k$ for the corresponding decision path in the SPM 61. The SPM 61 produces final decisions at output line 67 with a delay of dT seconds relative to time nT. It is a further feature of the present NPML detector that the delay parameter d can generally be made shorter compared to that of a conventional MLSD detector designed for PR signaling (i.e., PR signaling schemes with spectral nulls, such as PR4).

NPML Detector Using Four Predictor Coefficients (N=4) and Two States (K=1)

Figure 5:
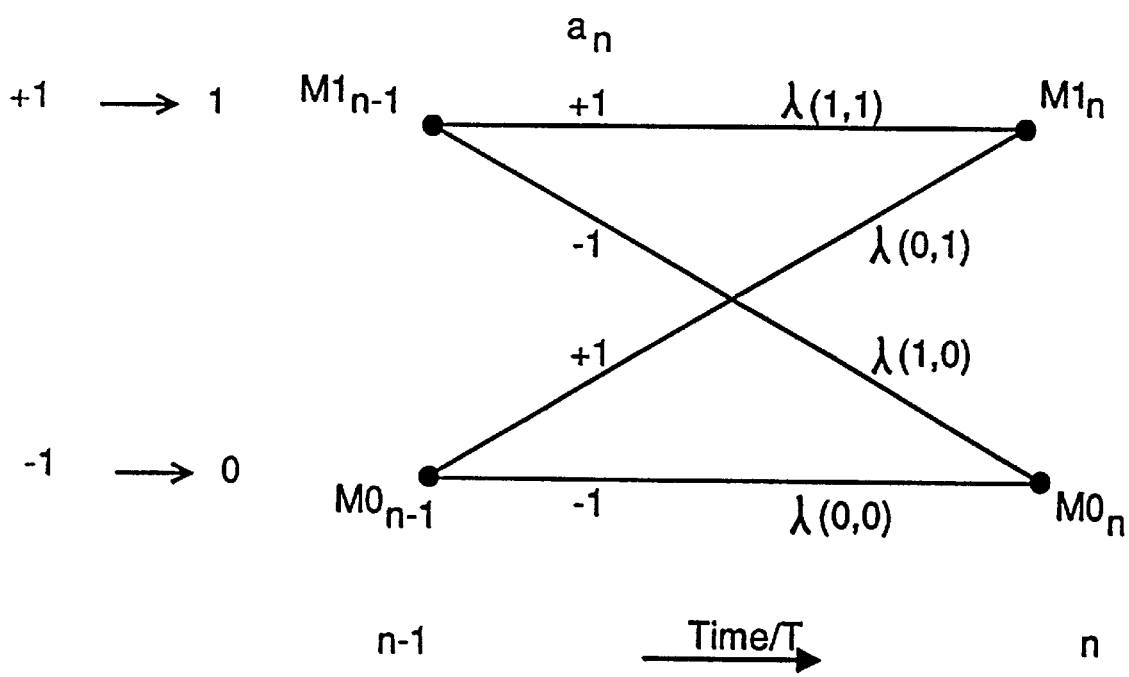
FIG. 5 Shows a 2-state trellis diagram.
Figure 6:
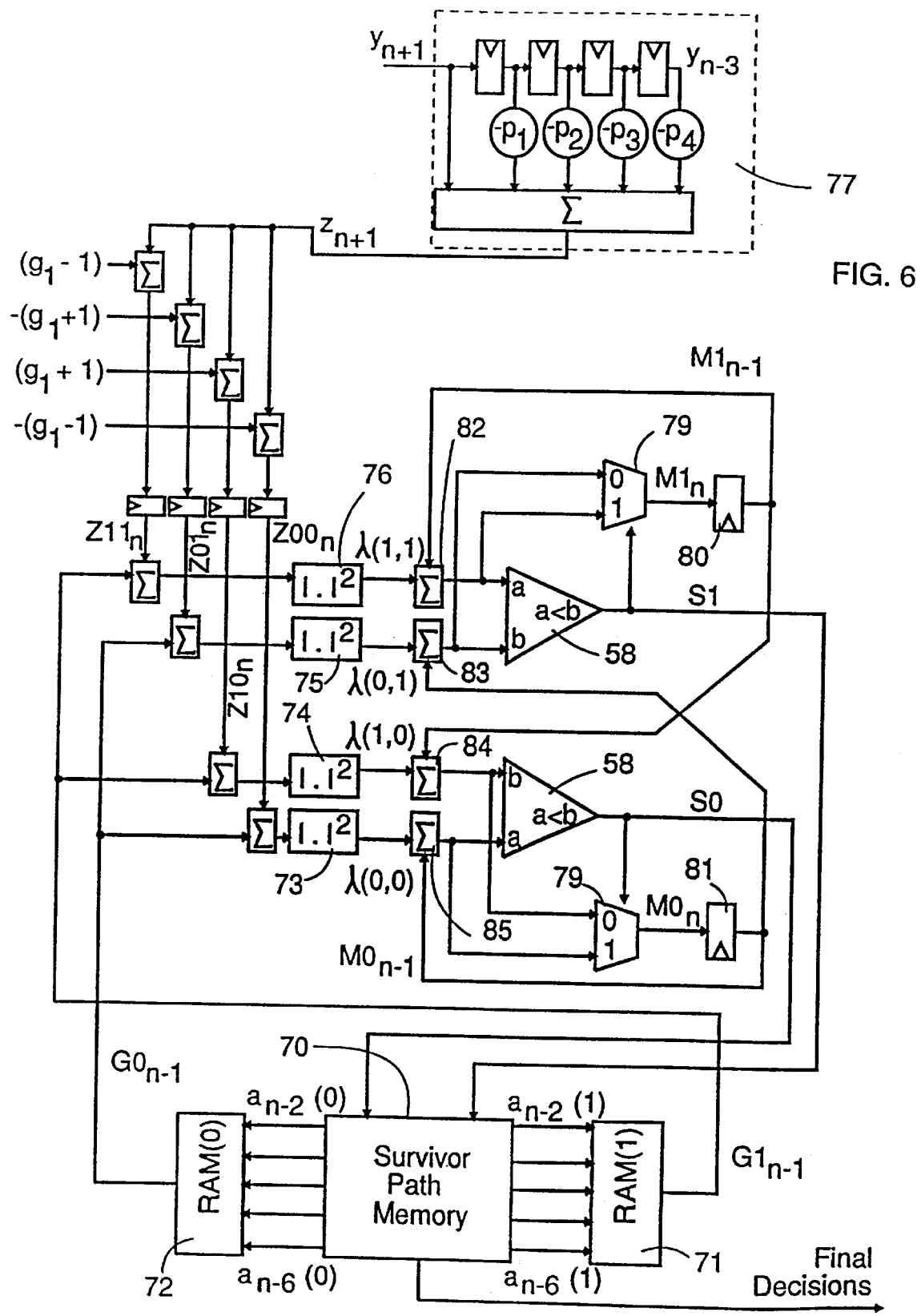
FIG. 6 Shows an implementation of a 2-state NPML detector with a 4-tap predictor, according to the present invention.

For N=4 and K=1 the branch metrics based on (5) become $$\lambda(s_j, s_k) = \left| z_n + \sum_{i=2}^{6} a_{n-i}(s_j)g_i + a_{n-1}g_1 - a_n \right|^2 \quad (7)$$

where the signal sample $$z_n = y_n - \sum_{i=1}^{4} y_{n-i} p_i$$

is the output of the prediction error filter 41. Associating the data symbols "+1" and "−1" with the binary numbers 1 and 0, respectively, the state information $a_{n-1}=+1(-1)$ is mapped into the present state $s_j=1(0)$ and the present data symbol $a_n=+1(-1)$ mapped into the next state $s_k=1(0)$. Letting $$G1_{n-1} = \sum_{i=2}^{6} a_{n-i}(1)g_i, \quad (8)$$

$$G0_{n-1} = \sum_{i=2}^{6} a_{n-i}(0)g_i, \quad (9)$$

one obtains the four branch metrics $$\lambda(1,1)=|z_n+G1_{n-1}+g_1-1|^2, \quad (10)$$

$$\lambda(1,0)=|z_n+G1_{n-1}+g_1+1|^2, \quad (11)$$

$$\lambda(0,1)=|z_n+G0_{n-1}-g_1-1|^2, \quad (12)$$

$$\lambda(0,0)=|z_n+G0_{n-1}-g_1+1|^2, \quad (13)$$

where $z_n$ are the samples obtained from the corresponding 4-tap prediction error filter connected in cascade with the equalizer (see FIG. 2C). It will be useful to define the quantities $$Z11_n=z_n+g_1-1, \quad (14)$$

$$Z10_n=z_n+g_1+1, \quad (15)$$

$$Z01_n=z_n-g_1-1, \quad (16)$$

$$Z00_n=z_n-g_1+1, \quad (17)$$

since they can be precomputed outside the feedback loop, if necessary by means of pipelining. Thus, eqs. (10)–(13) can be written as $$\lambda(1,1)=|Z11_n+G1_{n-1}|^2, \quad (18)$$

$$\lambda(1,0)=|Z10_n+G1_{n-1}|^2, \quad (19)$$

$$\lambda(0,1)=|Z01_n+G0_{n-1}|^2, \quad (20)$$

$$\lambda(0,0)=|Z00_n+G0_{n-1}|^2, \quad (21)$$

respectively. Finally, defining the stored metrics $M1_{n-1}$ and $M0_{n-1}$ for states 1 and 0, respectively, the trellis diagram shown in FIG. 5 is obtained. The metrics are updated according to $$M1_n = \min\{M1_{n-1}+\lambda(1,1);\ M0_{n-1}+\lambda(0,1)\}, \quad (22)$$

$$M0_n = \min\{M1_{n-1}+\lambda(1,0);\ M0_{n-1}+\lambda(0,0)\}, \quad (23)$$

and direct mapping of the trellis shown in FIG. 5 into hardware functions leads to the implementation of the 2-state NPML detector with a 4-tap predictor 77 shown in FIG. 6. It is proposed here to generate the terms $G1_{n-1}$ and $G0_{n-1}$, defined by (8) and (9), respectively, by means of RAM-based filter structures 71, 72 which can be loaded with the appropriate (five) path history decisions. Also indicated in FIG. 6 is the 2-state SPM 70 fed by the two comperators 58. In an alternate embodiment (not shown), the functions of SPM 70 and RAM-based filters 71, 72 shown in FIG. 6 could be combined in an attempt to speed-up computation of $G1_{n-1}$ and $G0_{n-1}$. Note further, that the squaring functions in FIG. 6, realized by means of units 73–76, can be approximated to simplify the required circuitry, with minimal loss in performance. The decision signals S1 and S0 in FIG. 6 are used to control the metric multiplexers 79 and the path update in the SPM 70. The selected metrics $M1_n$ and $M0_n$ are stored in registers 80 and 81, respectively.

Figure 7:
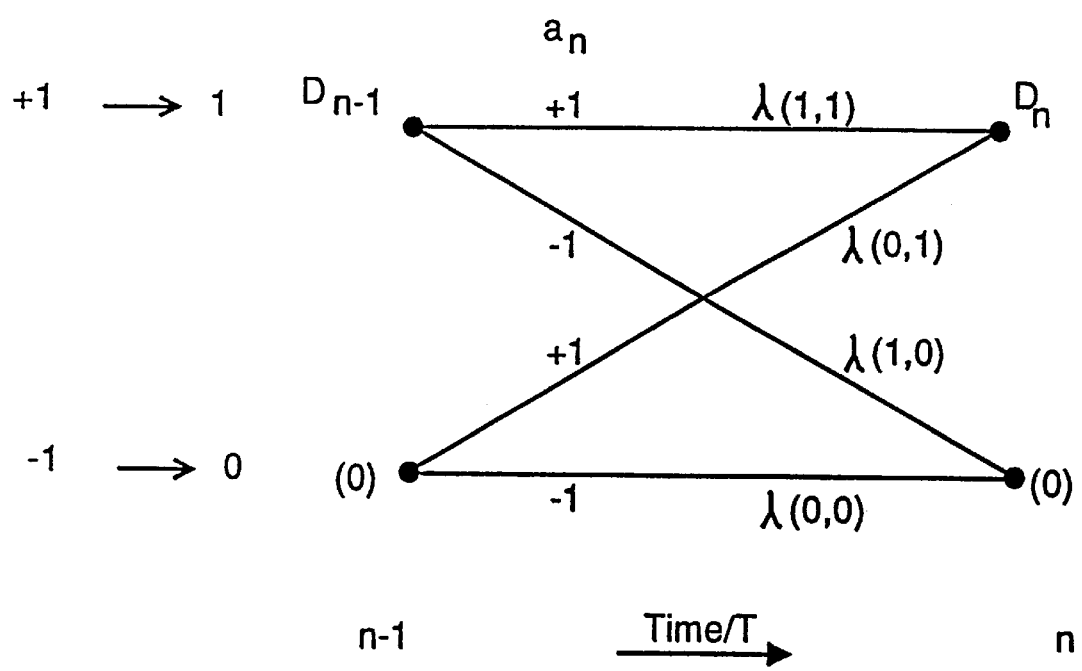
FIG. 7 Shows a 2-state trellis (difference metric) diagram.
Figure 8:
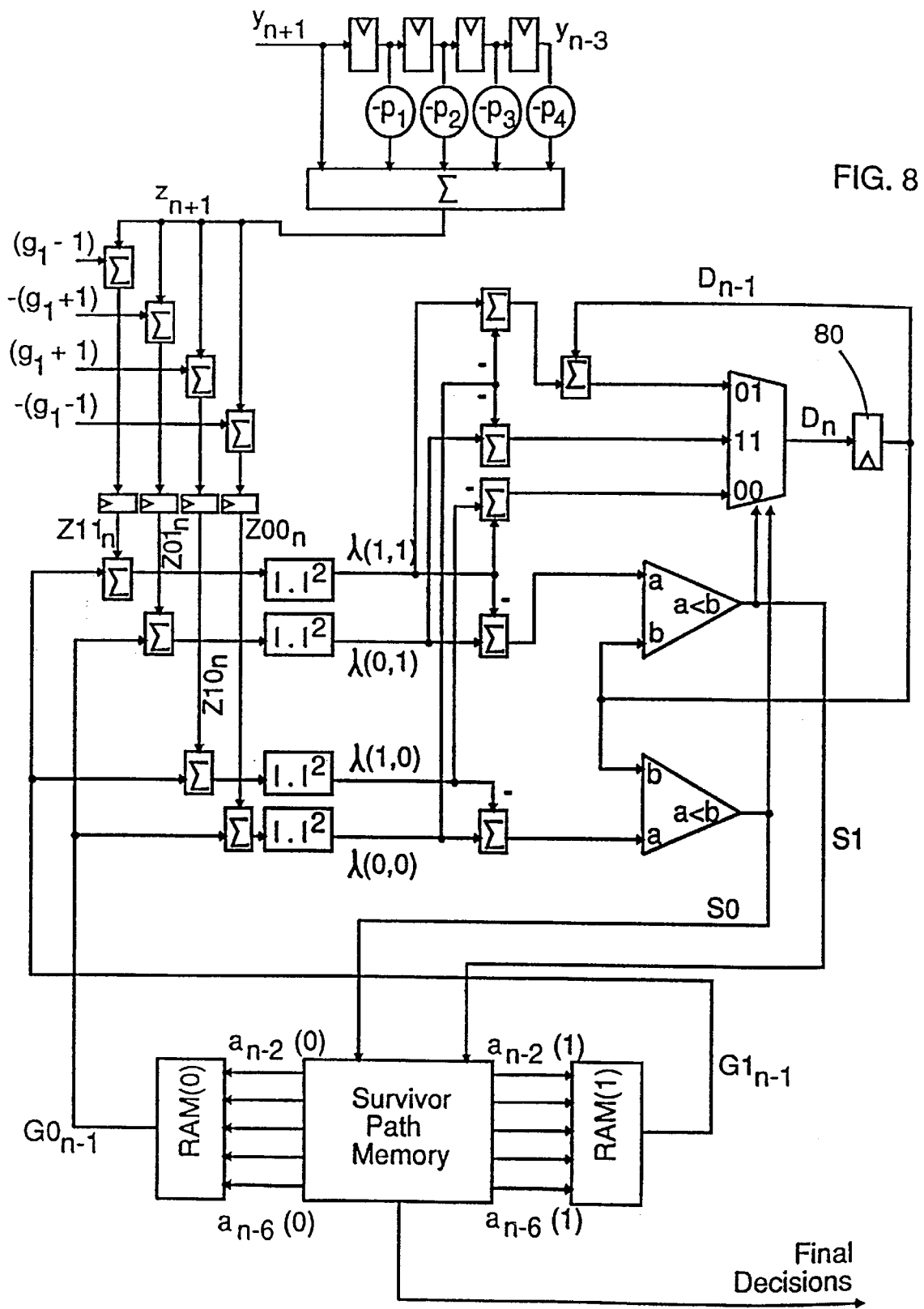
FIG. 8 Shows one possible way of mapping the algorithm implied by the trellis diagram in FIG. 7 into hardware, where the threshold for the comparators is provided by the stored difference metric $D_{n-1}$.

A multitude of variations of the implementation shown in FIG. 6 is possible, depending on constraints, complexity, critical timing paths, and algorithmic issues such as metric bounding. For example, automatic metric bounding can be achieved by using the conventional modulo technique in the adders 82–85 feeding the comparator inputs 58, as described in "An Alternative to metric resealing in Viterbi decoders," A. P. Hekstra, IEEE Transactions on Communications, Vol. 37, No. 11, pp. 1220–1222, November 1989. An alternate method of metric normalization can be implemented by applying the concept of a difference metric. Defining the difference metric $$D_{n-1} = M1_{n-1} - M0_{n-1} \quad (24)$$

the trellis in FIG. 7 is obtained where the metrics are updated such that the metric for state 0 is always the zero-valued metric. Thus, the difference metric is updated according to $$D_n = \min\{D_{n-1}+\lambda(1,1);\ \lambda(0,1)\} - \min\{D_{n-1}+\lambda(1,0);\ \lambda(0,0)\} \quad (25)$$

where one can show that the cross-extension of the trellis in FIG. 7, which would lead to the difference metric $D_n = \lambda(0,1) - [D_{n-1}+\lambda(1,0)]$, is not possible. Thus, only three of the four potential values of $D_n$ in (25) will have to be considered. One possible way of mapping the algorithm implied by the trellis description in FIG. 7 into hardware is shown in FIG. 8 where the threshold for the comparators is now provided by the difference metric $D_{n-1}$ stored in register 80. FIG. 8 is otherwise similar to FIG. 6. The difference metric approach is useful in cases where it is not possible or convenient to use the conventional modulo technique which relies on 2s-complement arithmetic for metric normalization.

NPML Detector Using Two Predictor Coefficients (N=2) and Four States (K=2)

For N=2 and K=2, i.e., $2^K=4$ states, the branch metrics based on (5) become $$\lambda(s_j, s_k) = \left| z_n + \sum_{i=3}^{4} a_{n-i}(s_j)g_i + a_{n-1}g_1 + a_{n-2}g_2 - a_n \right|^2 \quad (26)$$

where the signal sample $z_n = y_n - y_{n-1}p_1 - y_{n-2}p_2$ is the output of the 2-tap prediction error filter. Associating again the data symbols "+1" and "−1" with the binary numbers 1 and 0, respectively, we map the state information $(a_{n-2}, a_{n-1}) = (-1,-1), (-1,+1), (+1,-1)$ and $(+1,+1)$ into the present state $s_j=0, 1, 2,$ and 3, respectively. Similarly, the next state information $(a_{n-1}, a_n) = (-1,-1), (-1,+1), (+1,-1)$ and $(+1,+1)$ is mapped into the next state $s_k=0, 1, 2,$ and 3, respectively. Letting $$G3_{n-1} = \sum_{i=3}^{4} a_{n-i}(3)g_i \quad (27)$$
$$= a_{n-3}(3)g_3 + a_{n-4}(3)g_4,$$

$$G2_{n-1} = \sum_{i=3}^{4} a_{n-i}(2)g_i \quad (28)$$
$$= a_{n-3}(2)g_3 + a_{n-4}(2)g_4,$$

$$G1_{n-1} = \sum_{i=3}^{4} a_{n-i}(1)g_i \quad (29)$$
$$= a_{n-3}(1)g_3 + a_{n-4}(1)g_4,$$

$$G0_{n-1} = \sum_{i=3}^{4} a_{n-i}(0)g_i \quad (30)$$
$$= a_{n-3}(0)g_3 + a_{n-4}(0)g_4,$$

one obtains the eight branch metrics $$\lambda(3,3) = |z_n + G3_{n-1} + g_1 + g_2 - 1|^2, \quad (31)$$
$$\lambda(3,2) = |z_n + G3_{n-1} + g_1 + g_2 - 1|^2, \quad (32)$$
$$\lambda(2,1) = |z_n + G2_{n-1} + g_1 - g_2 - 1|^2, \quad (33)$$
$$\lambda(2,0) = |z_n + G2_{n-1} + g_1 - g_2 + 1|^2, \quad (34)$$
$$\lambda(1,3) = |z_n + G1_{n-1} - g_1 + g_2 + 1|^2, \quad (35)$$
$$\lambda(1,2) = |z_n + G1_{n-1} - g_1 + g_2 + 1|^2, \quad (36)$$
$$\lambda(0,1) = |z_n + G0_{n-1} - g_1 - g_2 + 1|^2, \quad (37)$$
$$\lambda(0,0) = |z_n + G0_{n-1} - g_1 - g_2 + 1|^2, \quad (38)$$

where $z_n$ are the samples obtained from the corresponding 2-tap predictor filter connected in cascade with the equalizer, see FIG. 2C. It will be useful to define the quantities $$Z33_n = z_n + g_1 + g_2 - 1, \quad (39)$$
$$Z32_n = z_n + g_1 + g_2 + 1, \quad (40)$$
$$Z21_n = z_n + g_1 - g_2 - 1, \quad (41)$$
$$Z20_n = z_n + g_1 - g_2 + 1, \quad (42)$$
$$Z13_n = z_n - g_1 + g_2 - 1, \quad (43)$$
$$Z12_n = z_n - g_1 + g_2 + 1, \quad (44)$$
$$Z01_n = z_n - g_1 - g_2 - 1, \quad (45)$$
$$Z00_n = z_n - g_1 - g_2 + 1, \quad (46)$$

since they can be precomputed outside the feedback loop, if necessary by means of pipelining. Thus, eqs. (31)–(38) can be written as $$\lambda(3,3) = |Z33_n + G3_{n-1}|^2, \quad (47)$$
$$\lambda(3,2) = |Z32_n + G3_{n-1}|^2, \quad (48)$$
$$\lambda(2,1) = |Z21_n + G2_{n-1}|^2, \quad (49)$$
$$\lambda(2,0) = |Z20_n + G2_{n-1}|^2, \quad (50)$$
$$\lambda(1,3) = |Z13_n + G1_{n-1}|^2, \quad (51)$$
$$\lambda(1,2) = |Z12_n + G1_{n-1}|^2, \quad (52)$$
$$\lambda(0,1) = |Z01_n + G0_{n-1}|^2, \quad (53)$$
$$\lambda(0,0) = |Z00_n + G0_{n-1}|^2, \quad (54)$$

respectively. Finally, defining the stored (present) metrics $Ms_{j_{n-1}}$ for each of the present states $s_j=0, 1, 2,$ and 3, one obtains the trellis diagram shown in FIG. 9. The four metrics for the next states $s_k=0, 1, 2,$ and 3, are updated according to $$Ms_{k_n} = \min\{Ms_{j_{n-1}} + \lambda(s_j, s_k); Ms_{i_{n-1}} + \lambda(s_i, s_k)\}; \quad (55)$$

with $s_j$ and $s_i$ being the possible present states. Direct mapping of the trellis shown in FIG. 9 into hardware functions leads to the scheme shown in FIGS. 10A, 10B, 10C. The terms $G0_{n-1}, G1_{n-1}, G2_{n-1},$ and $G3_{n-1}$, defined by (27)–(30), respectively, can be generated by means of a random access memory 131–134 (RAM) which stores the appropriate values for the given coefficient $g_1$ and $g_2$, depending on the chosen operating point of the channel; the RAMs 131–134 need to hold only four different (actually two different and their negative) values. The 4-state SPM 135 is a register-exchange structure in case of high-speed implementation. Note that the squaring functions in (31)–(38) can be approximated to simplify the required circuitry, with minimal loss in performance. Four decision signals (S0, S1, S2, S3) are needed to control the metric multiplexers and the path update in the SPM 135. Automatic metric bounding is achieved by using the conventional modulo-2 technique in the adders 136–143 feeding the comparator inputs.

NPML Detector Using Four Predictor Coefficients (N=4) and Four States (K=2)

Figure 10A:
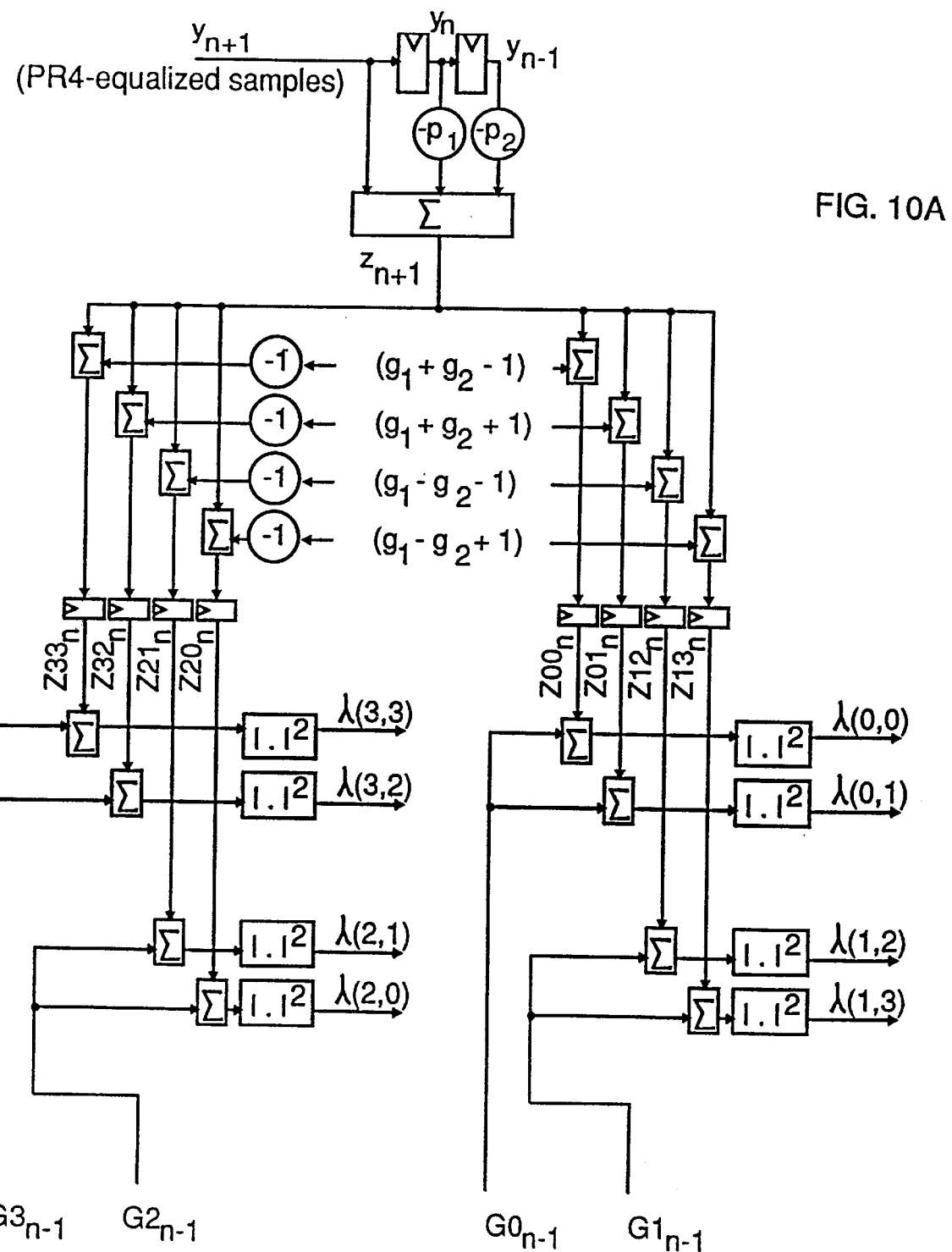
FIGS. 10A–10C Shows another implementation of an NPML detector, according to the present invention (4-state, 2-tap predictor).
Figure 10B:
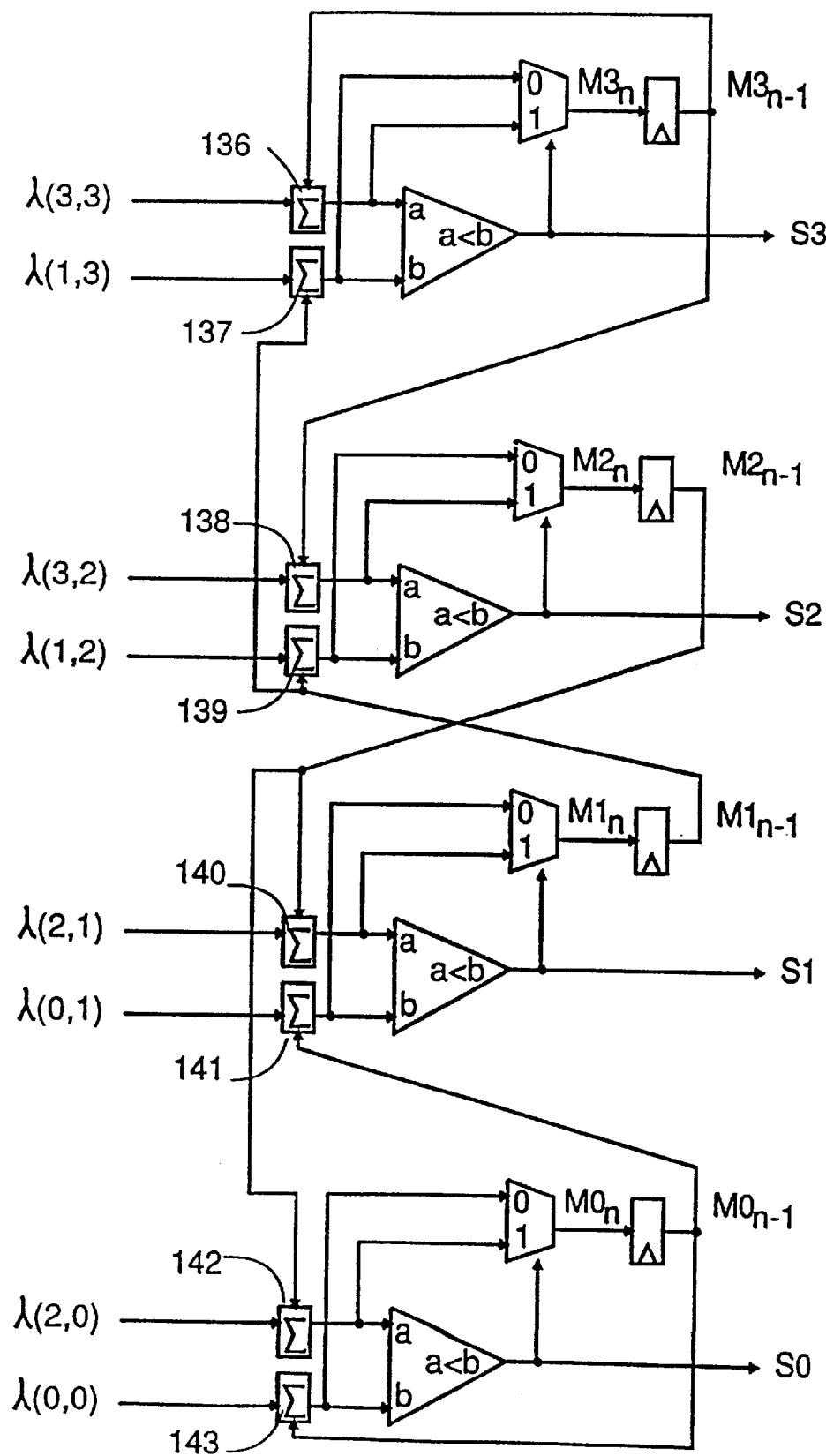
Figure 10C:
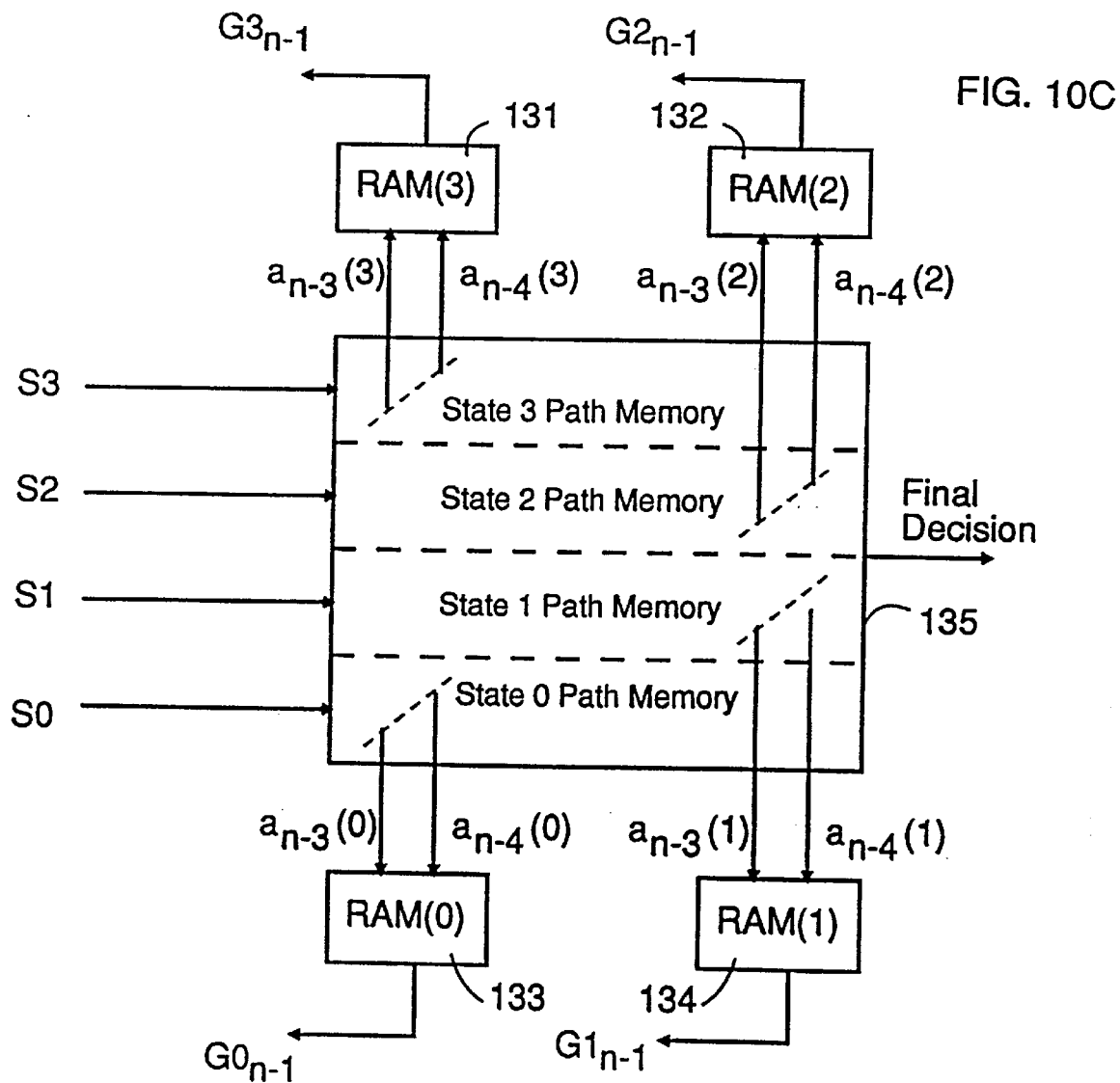
Figure 11A:
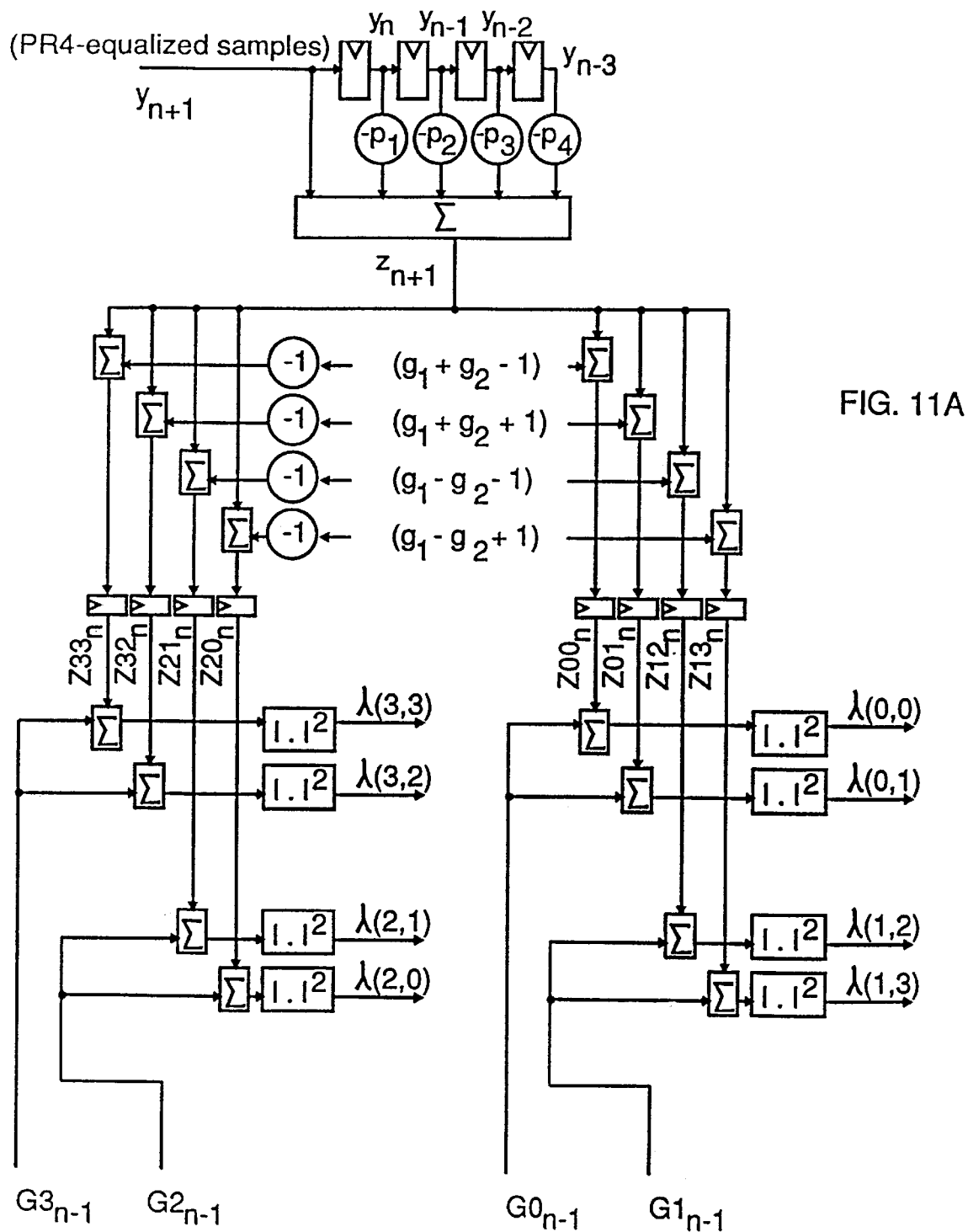
FIGS. 11A–11C Shows another implementation of an NPML detector, according to the present invention (4-state, 4-tap predictor).
Figure 11B:
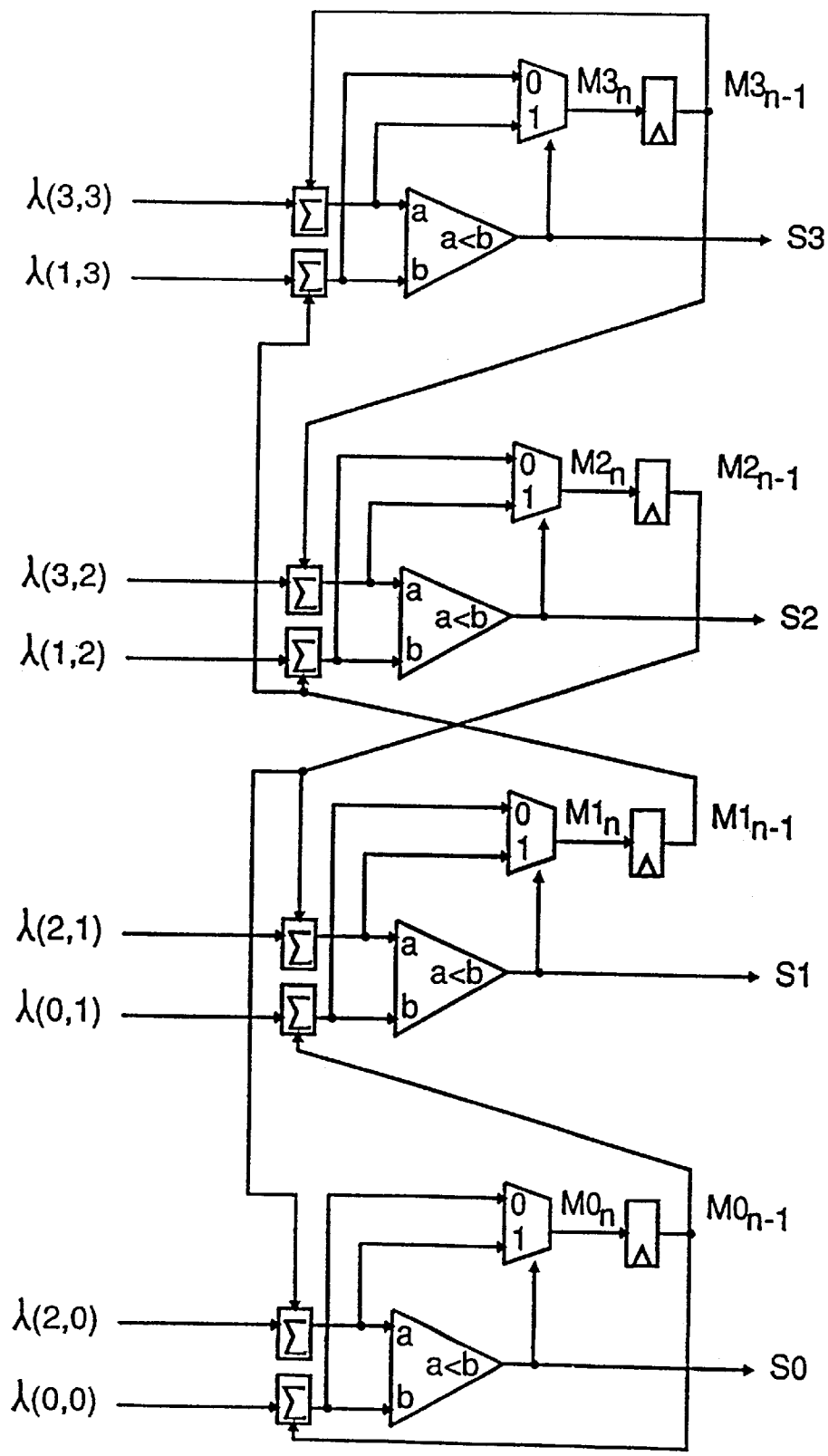
Figure 11C:
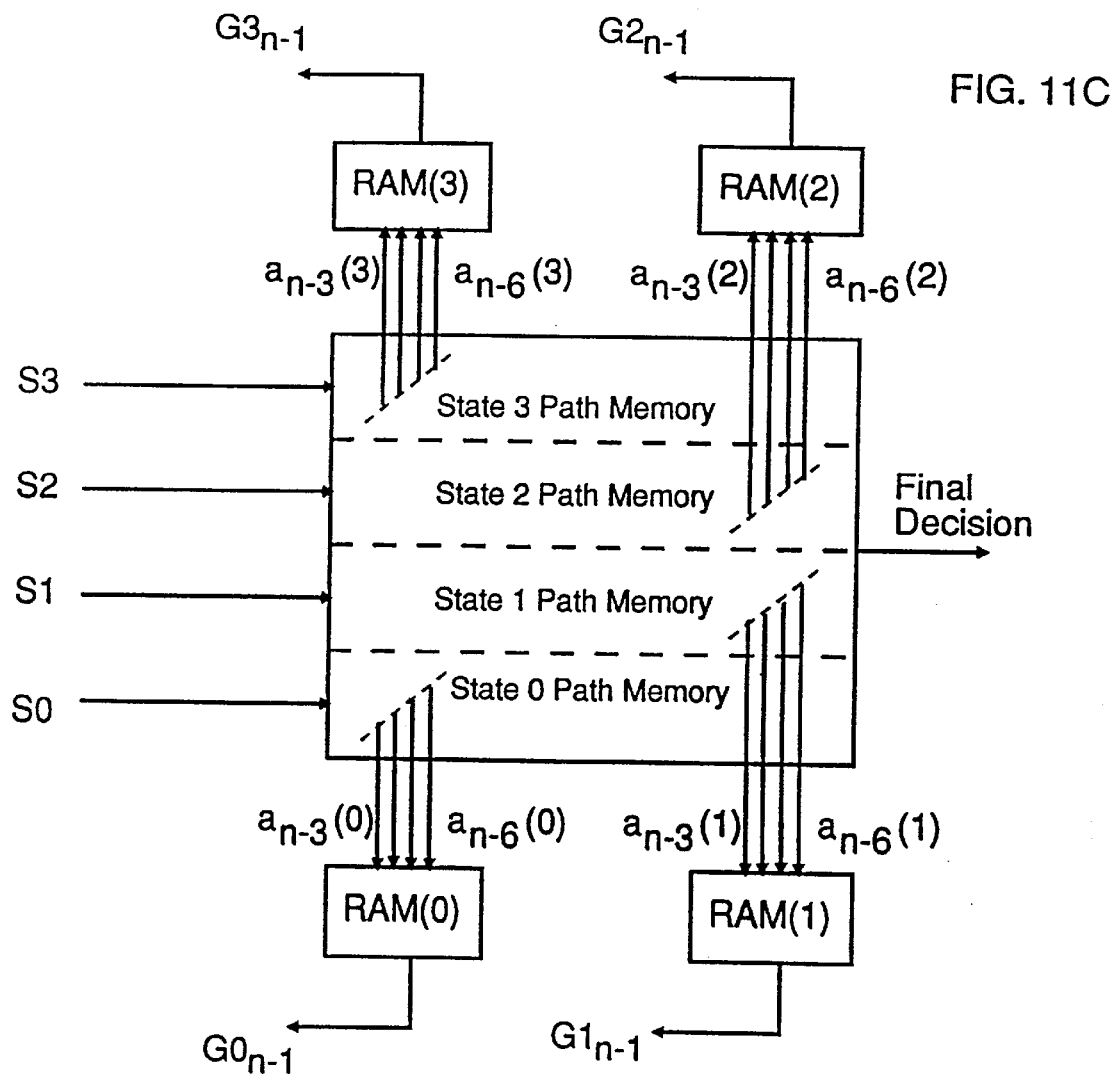

For N=4 and K=2, i.e., $2^K=4$ states, the branch metrics based on (5) become $$\lambda(s_j, s_k) = \left| z_n + \sum_{i=3}^{6} a_{n-i}(s_j)g_i + a_{n-1}g_1 + a_{n-2}g_2 - a_n \right|^2 \quad (56)$$

where the signal sample $$z_n = y_n - \sum_{i=1}^{4} y_{n-i} p_i$$

is the output of the prediction error filter. Associating again the data symbols "+1" and "−1" with the binary numbers 1 and 0, respectively, the state information $(a_{n-2}, a_{n-1})=(-1,-1),(-1,+1),(+1,-1)$, and $(+1,+1)$, is mapped into the present state $s_j=0, 1, 2$, and 3, respectively. Similarly, the next state information $(a_{n-1}, a_n)=(-1,-1),(-1,+1),(+1,-1)$, and $(+1,+1)$, is mapped into the next state $s_k=0, 1, 2$, and 3, respectively. Letting $$G3_{n-1} = \sum_{i=3}^{6} a_{n-i}(3)g_i, \qquad (57)$$

$$G2_{n-1} = \sum_{i=3}^{6} a_{n-i}(2)g_i, \qquad (58)$$

$$G1_{n-1} = \sum_{i=3}^{6} a_{n-i}(1)g_i, \qquad (59)$$

$$G0_{n-1} = \sum_{i=3}^{6} a_{n-i}(0)g_i, \qquad (60)$$

one obtains the eight branch metrics $$\lambda(3,3)=|z_n+G3_{n-1}+g_1+g_2-1|^2, \qquad (61)$$

$$\lambda(3,2)=|z_n+G3_{n-1}+g_1+g_2+1|^2, \qquad (62)$$

$$\lambda(2,1)=|z_n+G2_{n-1}+g_1-g_2-1|^2, \qquad (63)$$

$$\lambda(2,0)=|z_n+G2_{n-1}+g_1-g_2+1|^2, \qquad (64)$$

$$\lambda(1,3)=|z_n+G1_{n-1}-g_1+g_2-1|^2, \qquad (65)$$

$$\lambda(1,2)=|z_n+G1_{n-1}-g_1+g_2+1|^2, \qquad (66)$$

$$\lambda(0,1)=|z_n+G0_{n-1}-g_1-g_2-1|^2, \qquad (67)$$

$$\lambda(0,0)=|z_n+G0_{n-1}-g_1-g_2+1|^2, \qquad (68)$$

where $z_n$ are the samples obtained from the corresponding 4-tap prediction error filter connected in cascade with the equalizer (see FIG. 2C). It is useful to define the quantities $$Z33_n=z_n+g_1+g_2-1, \qquad (69)$$

$$Z32_n=z_n+g_1+g_2+1, \qquad (70)$$

$$Z21_n=z_n+g_1-g_2-1, \qquad (71)$$

$$Z20_n=z_n+g_1-g_2+1, \qquad (72)$$

$$Z13_n=z_n-g_1+g_2-1, \qquad (73)$$

$$Z12_n=z_n-g_1+g_2+1, \qquad (74)$$

$$Z01_n=z_n-g_1-g_2-1, \qquad (75)$$

$$Z00_n=z_n-g_1-g_2+1, \qquad (76)$$

since they can be precomputed outside the feedback loop, if necessary by means of pipelining. Thus, eqs. (61)–(68) can be written as $$\lambda(3,3)=|Z33_n+G3_{n-1}|^2, \qquad (77)$$

$$\lambda(3,2)=|Z32_n+G3_{n-1}|^2, \qquad (78)$$

$$\lambda(2,1)=|Z21_n-G2_{n-1}|^2, \qquad (79)$$

$$\lambda(2,0)=|Z20_n+G2_{n-1}|^2, \qquad (80)$$

$$\lambda(1,3)=|Z13_n+G1_{n-1}|^2, \qquad (81)$$

$$\lambda(1,2)=|Z12_n+G1_{n-1}|^2, \qquad (82)$$

$$\lambda(0,1)=|Z01_n+G0_{n-1}|^2, \qquad (83)$$

$$\lambda(0,0)=|Z00_n+G0_{n-1}|^2, \qquad (84)$$

respectively. Finally, defining the stored (present) metrics $Ms_{j_{n-1}}$ for each of the present states $s_j=0, 1, 2$, and 3, one obtains the trellis diagram shown in FIG. 9. The four metrics for the next states $s_k=0, 1, 2$, and 3, are updated according to $$Ms_{k_n}=\min\{Ms_{j_{n-1}}+\lambda(s_j, s_k); Ms_{i_{n-1}}+\lambda(s_i, s_k)\}, \qquad (85)$$

with $s_j$ and $s_i$ being the possible present states. Direct mapping of the trellis shown in FIG. 9 into hardware functions leads to an implementation structure shown in FIGS. 11A, 11B, and 11C. Note the similarity, respectively the differences, compared to FIGS. 10A, 10B, 10C (size of predictor filter and RAM address length). The terms $G0_{n-1}$, $G1_{n-1}$, $G2_{n-1}$, and $G3_{n-1}$, defined by (57)–(60), respectively, can be generated by means of RAM structures which can be loaded with appropriate values depending on the chosen operating point of the channel; the 4-state SPM can again be a register-exchange structure. Note that the squaring functions in (61)–(68) can be approximated to simplify the required circuitry, with minimal loss in performance. Four decision signals S0, S1, S2, and S3, are needed to control the metric multiplexers and the path update in the SPM.

A multitude of variations for the implementation of the 4-state NPML detector with a 4-ap noise predictor is possible, depending on constraints on complexity, critical timing paths, and algorithmic issues such as metric bounding. For example, automatic metric bounding can be achieved by using the conventional modulo technique in the adders feeding the comparator inputs. The alternate method of metric normalization, the difference metric technique introduced above, can be extended to the 4-state NPML detector, for example, by updating the metrics such that the stored metric of state 0 is always the zero-valued metric. Further variations for implementing (4-state) NPML detectors can be obtained by explicit expansion of the squaring function involved in evaluating the branch metrics $\lambda(s_j, s_k)$.

NPML Detector Using a Single-Tap Predictor (N=1) and Eight States (K=N+2=3)

It was pointed out hereinbefore that the 8-state NPML detector which uses a single-tap predictor (i.e., the case where N=1 and K=N+2=3 so that $2^K=8$ states) is a member within the family of NPML detectors which is of specific practical interest for DASD applications. Since in this particular case there is no feedback based on past decisions, i.e., the detector uses only (hypothesized) state information for noise prediction, the feedback loops via the FIR or RAM-based filters 64 and 65, as shown in FIG. 4, are not present. For N=1 and K=3 the 16 branch metrics based on (5) become $$\lambda(s_j, s_k)=|z_n+a_{n-1}g_1+a_{n-2}g_2+a_{n-3}g_3-a_n|^2 \qquad (86)$$

where the signal sample $z_n=y_n-p_1y_{n-1}$. Furthermore, since in (86) $g=p_1, g_2=1$, and $g_3=-p_1$, we can write $$\lambda(s_j, s_k) = |z_n + a_{n-1}p_1 + a_{n-2} - a_{n-3}p_1 - a_n|^2 \quad (87)$$

where the triple $(a_{n-3}, a_{n-2}, a_{n-1})$ represents the hypothesized state $s_j$, $a_n$ is the hypothesized transmitted symbol, and the triple $(a_{n-2}, a_{n-1}, a_n)$ represents the resulting next state $s_k$. In this situation it is advantageous to evaluate the square on the right hand side of (87), to drop all state-independent terms, and to scale the remaining expression. In this way, one arrives at the equivalent branch metric $$\lambda'(s_j, s_k) = -[a_n - a_{n-2} - (a_{n-1} - a_{n-3})p_1]z_n - (a_n a_{n-1} + a_{n-2} a_{n-3})p_1 - a_n a_{n-2} + (a_n a_{n-3} + a_{n-1} a_{n-2})p_1 - a_{n-1} a_{n-3} p_1^2. \quad (88)$$

We now arbitrarily use a somewhat different rule than the one used above to map the state information into the corresponding state number, namely, $s_j = (a_{n-3}, a_{n-2}, a_{n-1}) = (-1, -1, -1)$ maps to the state 0, $s_j = (a_{n-3}, a_{n-2}, a_{n-1}) = (+1, -1, -1)$ maps to the state 1, . . . , $s_j = (a_{n-3}, a_{n-2}, a_{n-1}) = (+1, +1, +1)$ maps to state 7. Next, adding the state-independent term $(1+p_1^2)$ to all sixteen branch metrics represented by (88) and dividing the result by 2, the equivalent branch metrics can be listed as $$\lambda''(0,0) = \lambda''(2,5) = \lambda''(5,2) = \lambda''(7,7) = 0 \quad (89)$$

$$\lambda''(0,4) = \lambda''(5,6) = -z_n + 1 \quad (90)$$

$$\lambda''(1,0) = \lambda''(3,5) = p_1(-z_n + p_1) \quad (91)$$

$$\lambda''(1,4) = \alpha(-z_n + \alpha) \quad (92)$$

$$\lambda''(2,1) = \lambda''(7,3) = z_n + 1 \quad (93)$$

$$\lambda''(3,1) = \beta(z_n + \beta) \quad (94)$$

$$\lambda''(4,2) = \lambda''(6,7) = p_1(z_n + p_1) \quad (95)$$

$$\lambda''(4,6) = \beta(-z_n + \beta) \quad (96)$$

$$\lambda''(6,3) = \alpha(z_n + \alpha) \quad (97)$$

where $$\alpha = 1 + p_1, \; \beta = 2 - \alpha = 1 - p_1, \; z_n = y_n - p_1 y_{n-1} \quad (98)$$

Figure 12:
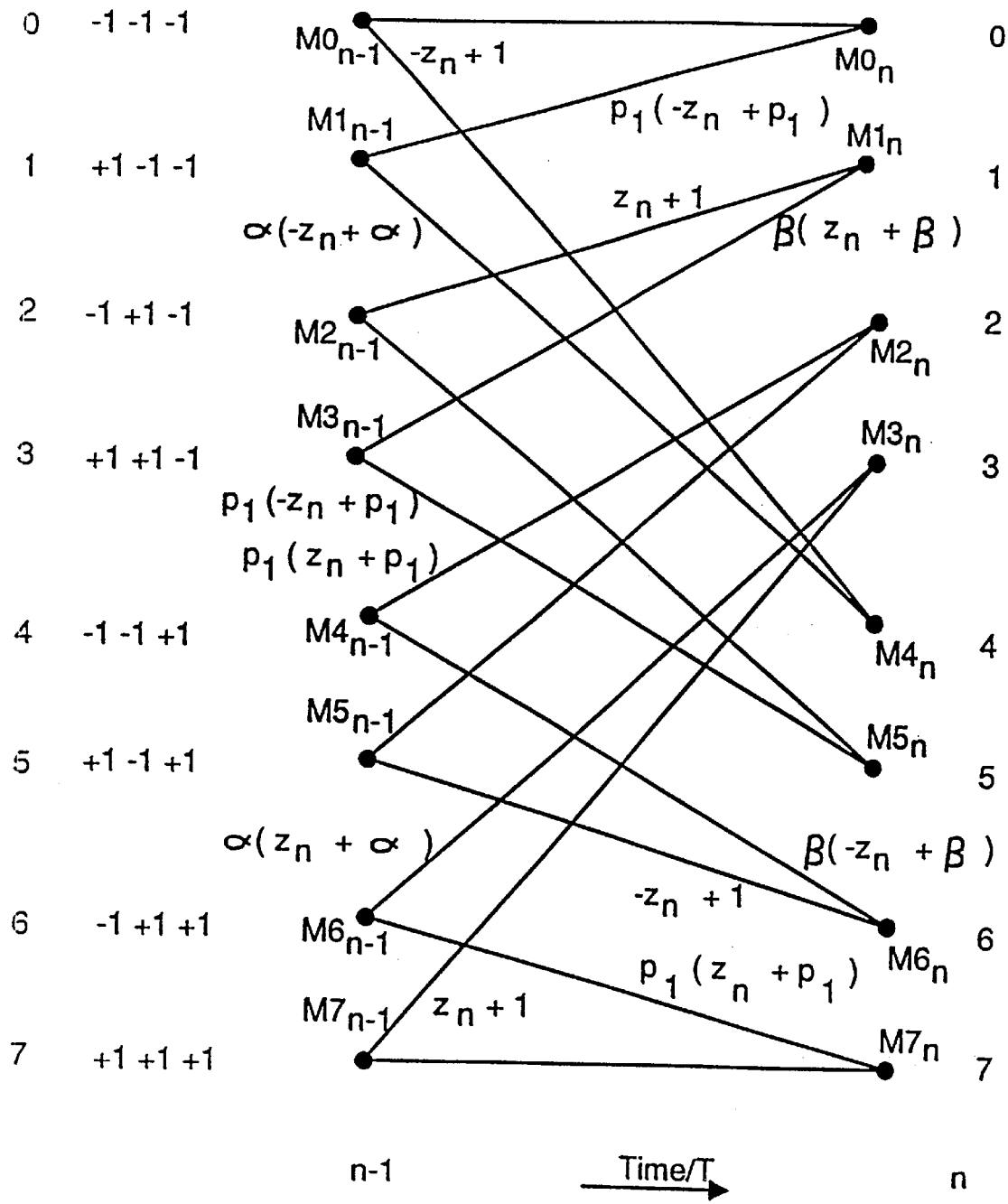
FIG. 12 Shows an 8-state trellis diagram with N=1 and K=3 (8-state, 1-tap predictor).
Figure 13:
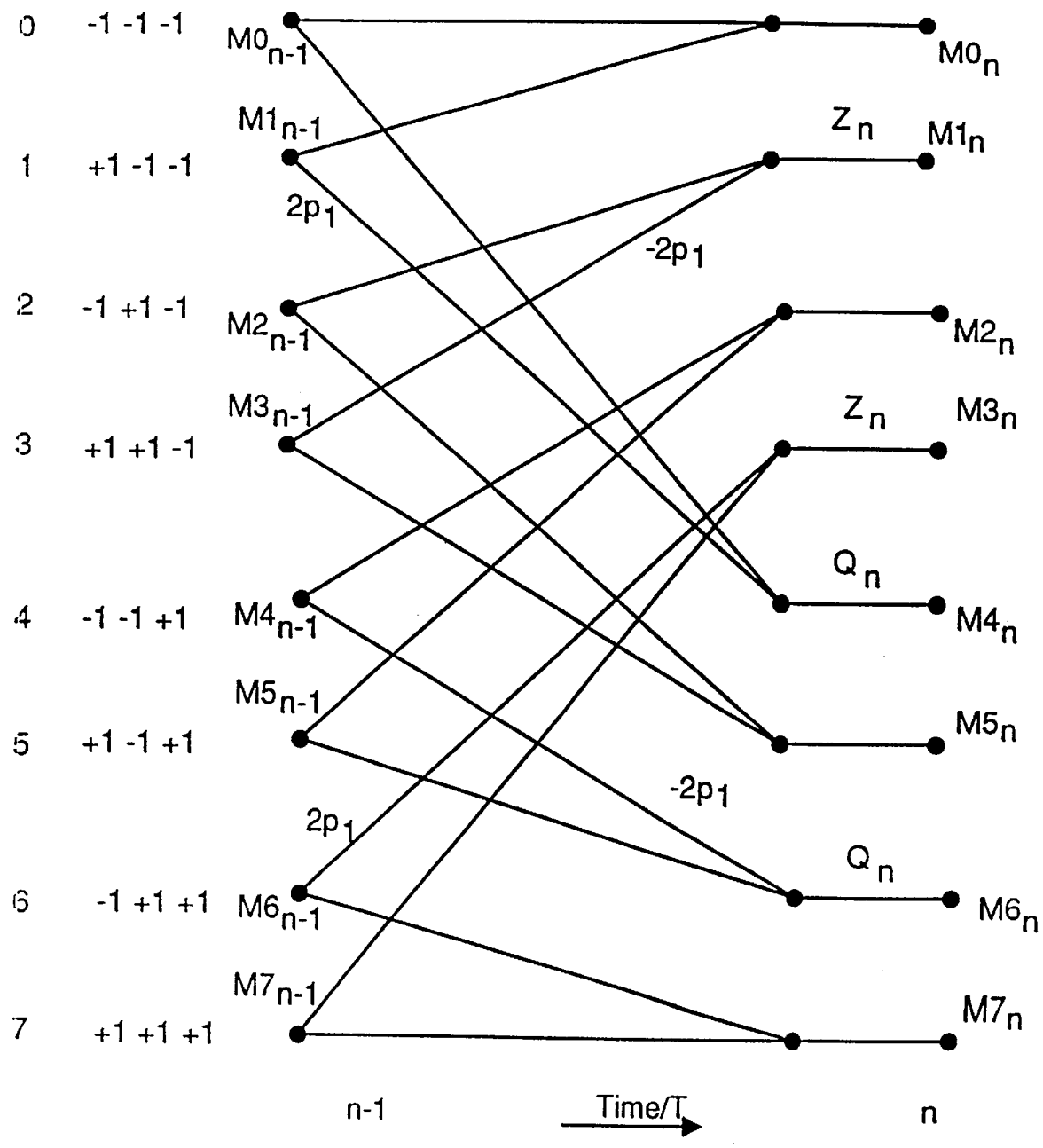
FIG. 13 Shows a transformed 8-state trellis diagram with N=1 and K=3 (8-state, 1-tap predictor).

Defining the stored metrics $Ms_{j_{n-1}}$ for the states $s_j = 0, 1, \ldots, 7$, one arrives at the trellis diagram shown in FIG. 12. The eight metrics $Ms_{k_n}$ for the next states $s_k = 0, 1, \ldots, 7$, are updated according to $$Ms_{k_n} = \min\{Ms_{j_{n-1}} + \lambda''(s_j, s_k); Ms_{i_{n-1}} + \lambda''(s_i, s_k)\}, \quad (99)$$

with $s_j$ and $s_i$ being the states at time n−1, according to the trellis in FIG. 12. The latter can in principle be mapped directly into a hardware structure. The trellis in FIG. 12 can be further simplified by applying a similar transformation technique as described in the patent application GB-A-2286952, published on Aug. 30, 1995; the resulting transformed trellis is shown in FIG. 13 where 12 of the 16 branch metrics are zero-valued and the remaining four have values $2p_1$ or $-2p_1$. Defining the filtered samples $$Y_n = -p_1 y_{n+1} + (1 + p_1^2) y_n - p_1 y_{n-1} \quad (100)$$

where $y_n = a_n - a_{n-2} +$ noise is the PR4-equalized, noisy sample, the quantities $Z_n$ and $Q_n$ shown in the trellis of FIG. 13 can be expressed as $$Z_n = Y_n + (1 + p_1^2) \quad (101)$$

and $$Q_n = -Y_n + (1 + p_1^2) = -Z_n + 2(1 + p_1^2), \quad (102)$$

respectively; if necessary, these quantities can be computed by pipelined circuitry since they are not part of the metric feedback loop. Direct mapping of the trellis in FIG. 13 into a hardware structure leads to the scheme shown in FIG. 14; the eight decision signals S0–S7 also control the operation of an 8-state SPM (register-exchange) not specifically shown. The SPM delivers the final decisions via the inverse precoder.

Figure 14:
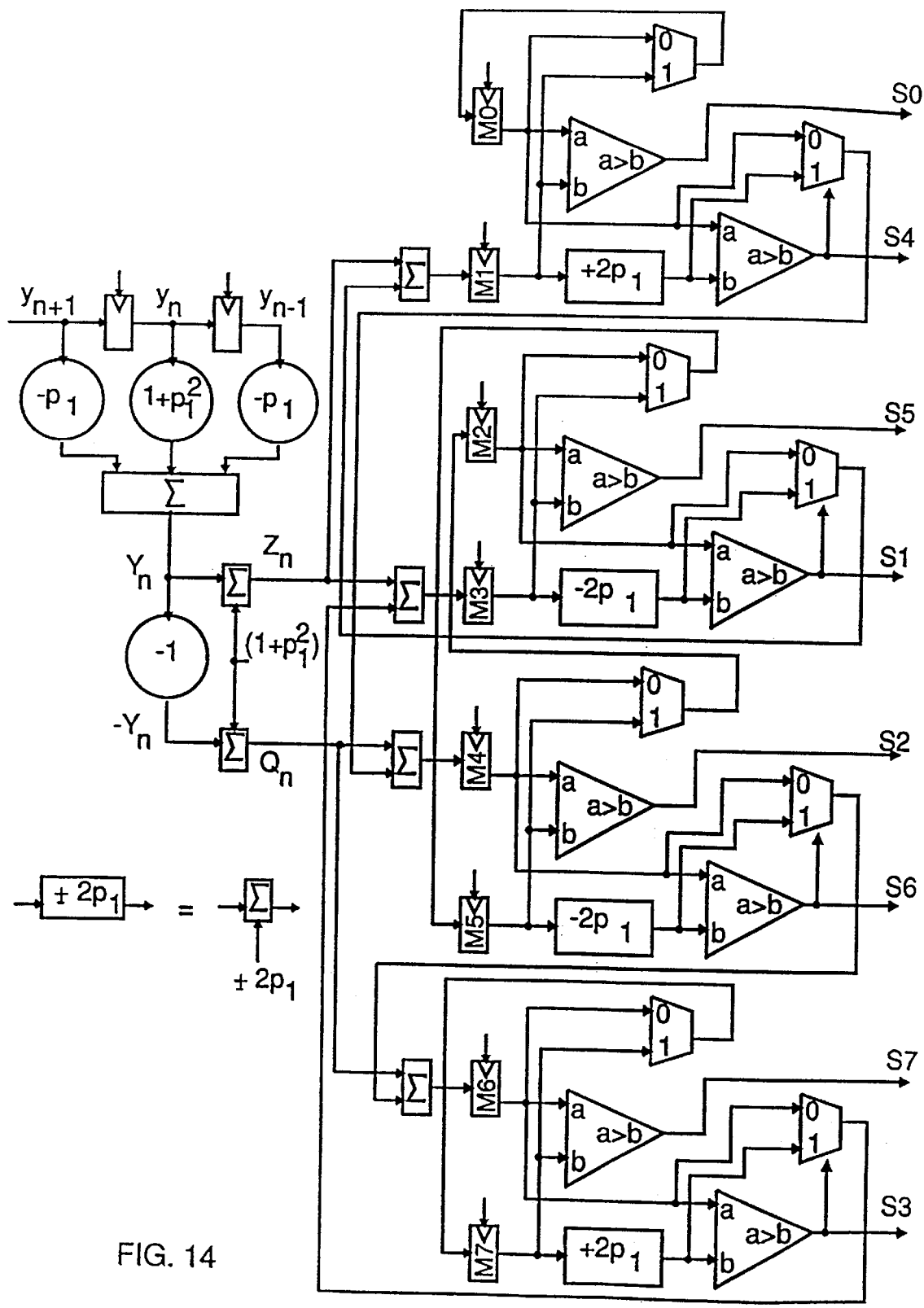
FIG. 14 Shows one possible way of mapping the algorithm implied by the trellis diagram in FIG. 13 into a hardware structure. The survivor path memory controlled by the select-signals S0, . . . , S7, is not shown.

A significant feature of the NPML scheme described by FIGS. 12–14 is its ability to perform the detection function for arbitrary values of the noise predictor coefficient $p_1$. Thus, by programming the hardware with the best suited predictor coefficient (depending on the channel operating point), optimal detection is obtained within the constraints of a single-tap predictor. In particular, by setting $p_1=0$, the scheme performs detection for PR4 signals, i.e., the hardware operates as a PRML detector. On the other hand, setting $p_1=-1$, the scheme performs detection for EPR4 signals, i.e., the hardware operates as an EPRML detector. The maximum required length of the SPM or, equivalently, the maximum decision delay for the final decisions, should be chosen such that the performance can be maintained for the most sensitive scheme (e.g. EPRML).

For implementation purposes, it may be advantageous to modify the algorithm outlined for the flexible 8-state, single-tap predictor NPML scheme by adding a convenient, state-independent term to $Z_n$ defined in eq. (101), e.g., such that $Z_n \rightarrow Z'_n = Y_n$. It has been shown in the patent application GB-A-2286952, published on Aug. 30, 1995, that the performance of the EPRML is not affected by such a measure since the channel is DC-free (spectral null at zero frequency); this property extends to NPML detectors as well. Thus, an alternate version of the scheme in FIG. 14 is obtained by modifying $Z_n$ and $Q_n$ such that $Z_n \rightarrow Z'_n = Y_n$ $Q_n \rightarrow Q'_n = -Y_n + 2(1 + p_1^2) = -Z'_n + 2(1 + p_1^2)$, respectively. Note that the condition $Z_n + Q_n = Z'_n + Q'_n = 2(1 + p_1^2)$, must always be satisfied by theory. However, as described in the patent application GB-A-2286952, published on Aug. 30, 1995, it may be advantageous in practice to modify this condition such that $Z_n + Q_n = Z'_n + Q'_n = 2(1 + p_1^2) - \gamma$, where $\gamma$ is a small, positive constant; a practical value may be $\gamma = 0.25$.

Alternate Forms of Implementation and Modifications

This section further demonstrates the multitude of forms of implementation which are possible for NPML detectors according to the present invention. Some alternate forms and simplifications of the detectors presented above are now described in some detail:

2-State, 4-Tap Predictor NPML

Letting $$GI'_{n-1} = g_1 + \sum_{i=2}^{6} a_{n-i}(1) g_i, \quad (103)$$

$$G0'_{n-1} = -g_1 + \sum_{i=2}^{6} a_{n-i}(0)g_i, \quad (104)$$

one obtains the four equivalent branch metrics $$\lambda(1,1)=|z_n+G1'_{n-1}-1|^2, \quad (105)$$

$$\lambda(1,0)=|z_n+G1'_{n-1}+1|^2, \quad (106)$$

$$\lambda(0,1)=|z_n+G0'_{n-1}+1|^2, \quad (107)$$

$$\lambda(0,0)=|z_n+G0'_{n-1}+1|^2, \quad (108)$$

where $z_n$ are the samples obtained from the corresponding 4-tap prediction error filter connected in cascade with the equalizer (see FIG. 2C). It is useful to define the new quantities $$Z1_n = z_n - 1, \quad (109)$$

$$Z0_n = z_n + 1, \quad (110)$$

so that eqs. (105)–(108) can be written as $$\lambda(1,1)=|Z1_n+G1'_{n-1}|^2, \quad (111)$$

$$\lambda(1,0)=|Z0_n+G1'_{n-1}|^2, \quad (112)$$

$$\lambda(0,1)=|Z1_n+G0'_{n-1}|^2, \quad (113)$$

$$\lambda(0,0)=|Z0_n+G0'_{n-1}|^2, \quad (114)$$

Figure 15:
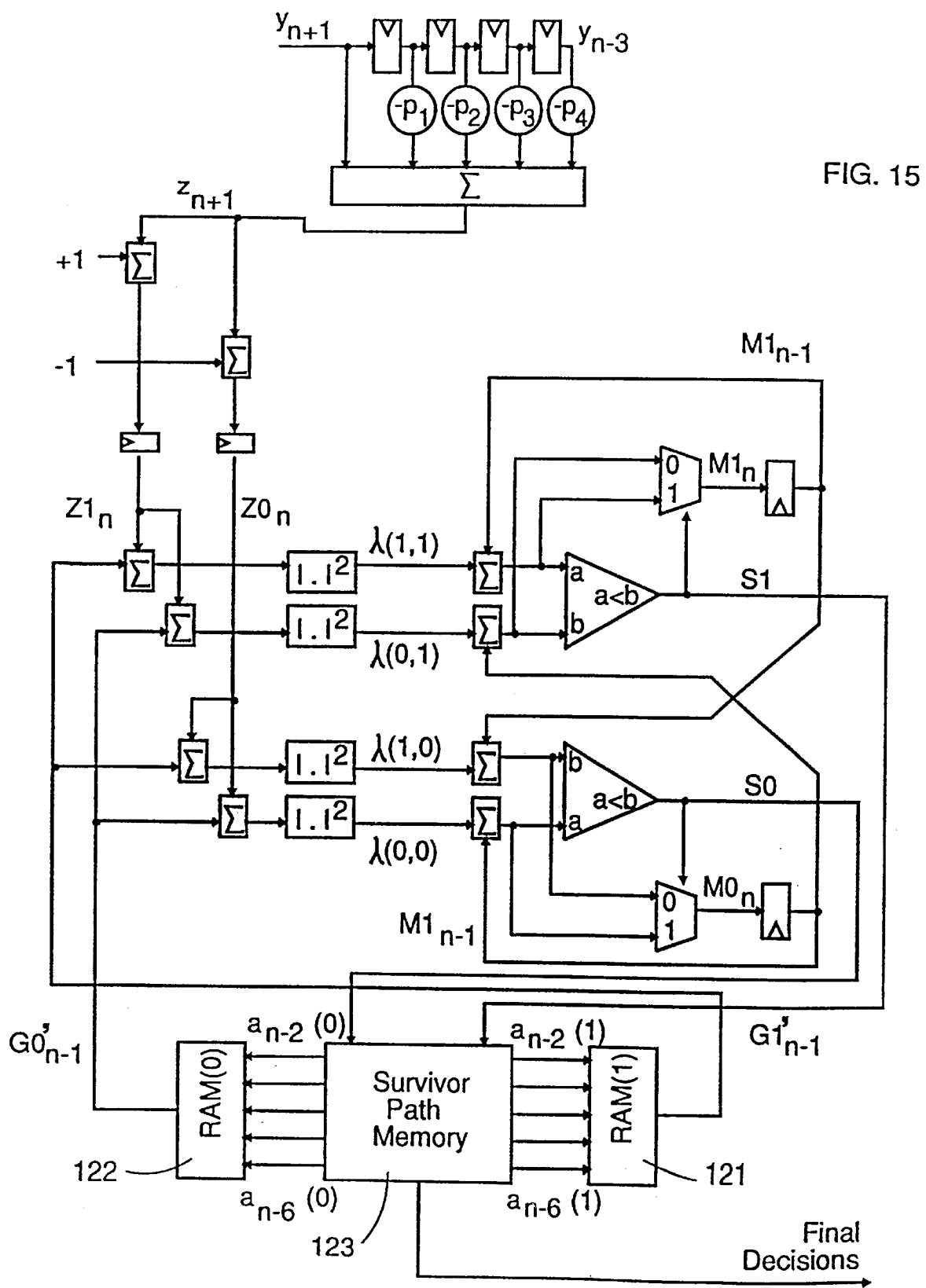
FIG. 15 Shows an alternate form of implementing the functions of the 2-state NPML detector with a 4-tap predictor shown in FIG. 6.

The alternate form of implementing the functions of FIG. 6 is shown in FIG. 15. Here, it is proposed to generate the terms $G1'_{n-1}$ and $G0'_{n-1}$, defined by (103) and (104), respectively, by means of random access memory table look-up where the RAMs 121, 122 can be loaded with appropriate values (32 for each RAM) depending on the chosen operating point of the channel. The SPM 123 provides the five address bits $a_{n-2}(1), \ldots, a_{n-6}(1)$ and $a_{n-2}(0), \ldots, a_{n-6}(0)$ for the RAMs 121 and 122, respectively, as indicated in FIG. 15.

Computation of the branch metrics for the difference metric approach (FIG. 8) can be modified similarly; in this case, further simplifications are possible. For example, the potential difference metrics $D_n = \lambda(0,1) = -4(z_n + G0'_{n-1})$ and $D_n = \lambda(1,1) = -4(z_n + G1'_{n-1})$ which have to be precomputed, have simple expressions in terms of the signal sample $z_n$ and the respective quantities generated by the RAMs.

4-State, N-Tap Predictor NPML where N=2 or 4 (Alternative 1)

Figure 9:
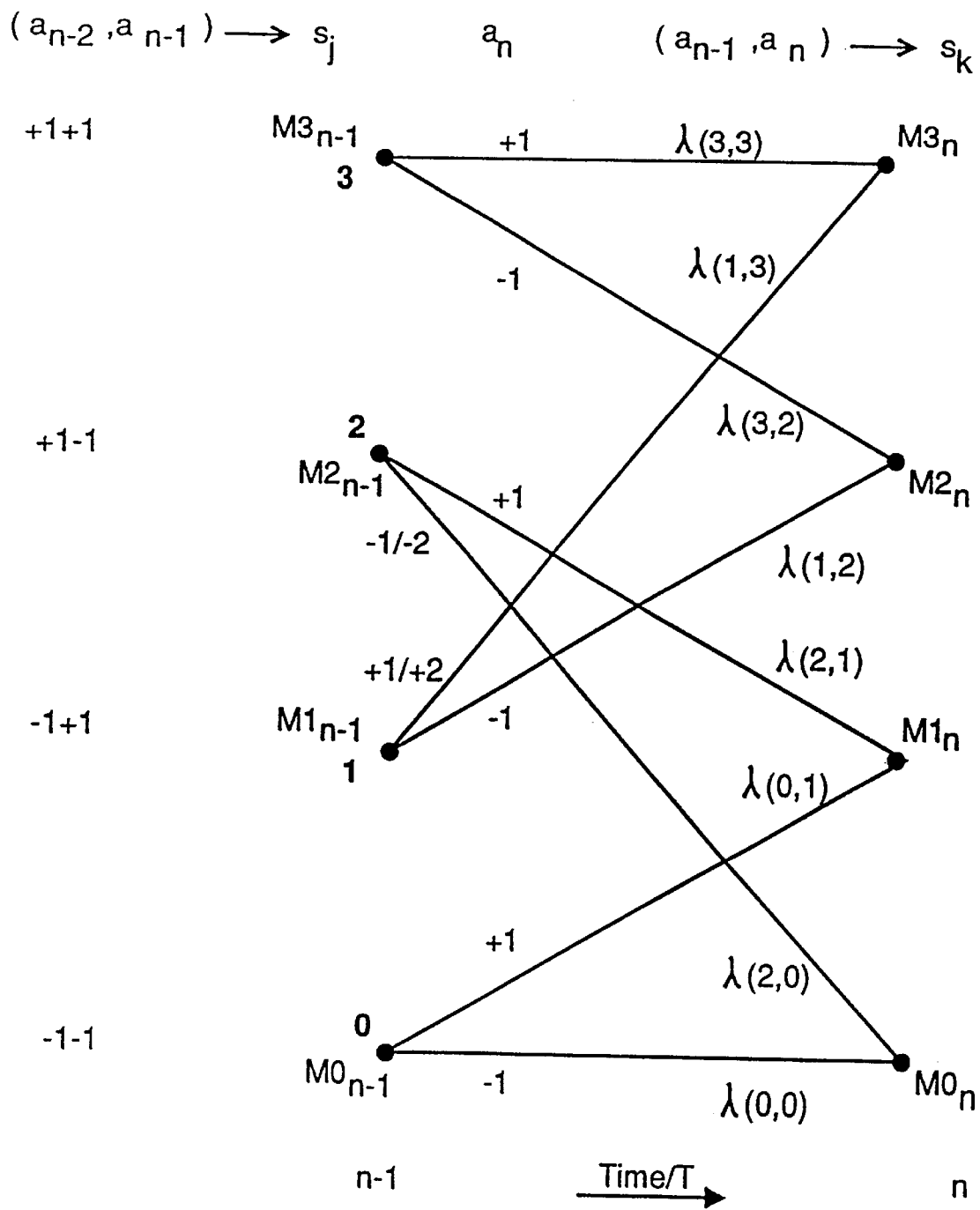
FIG. 9 Shows a 4-state trellis diagram.
Figure 16A:
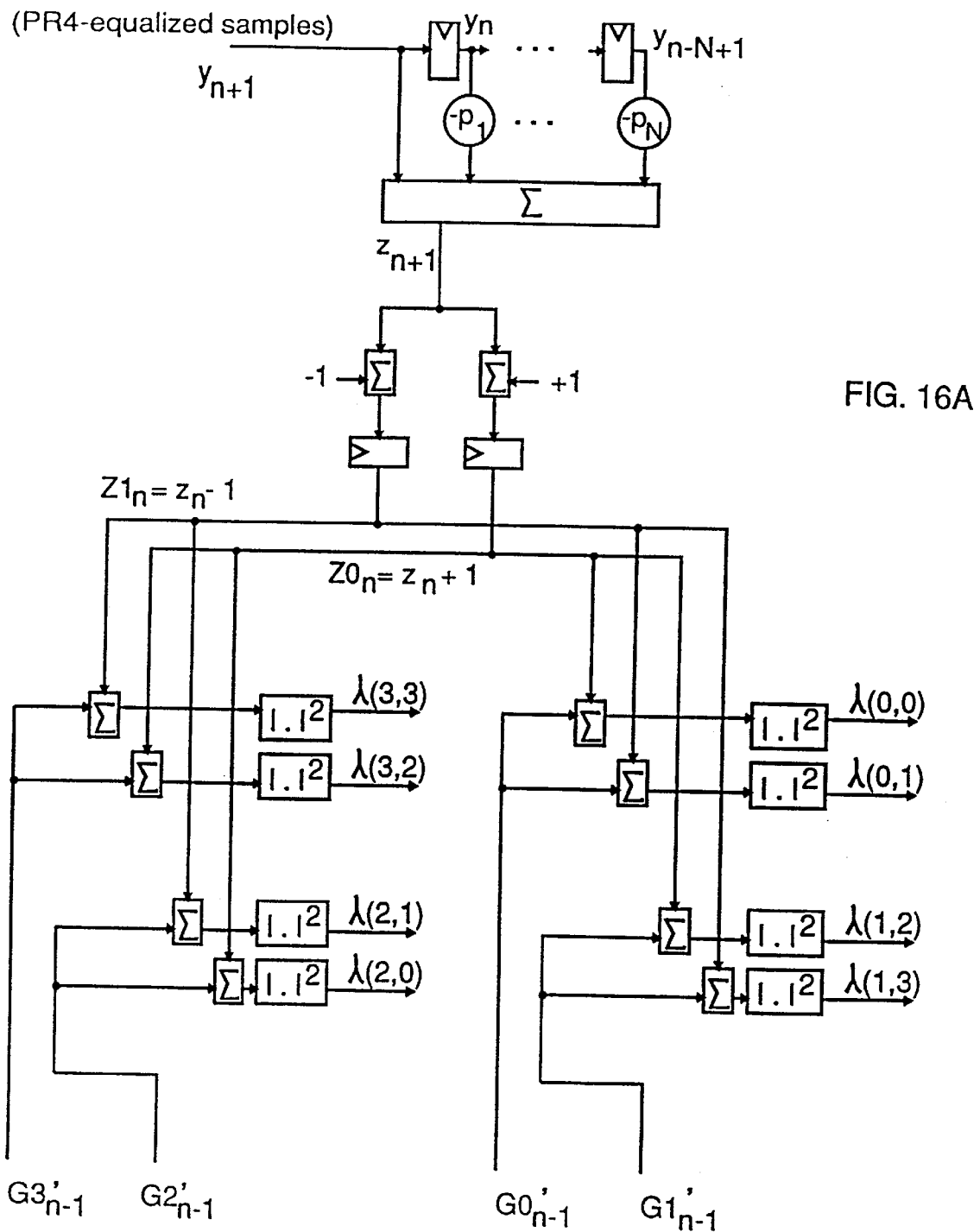
FIGS. 16A–16C Shows another implementation of an NPML detector, according to the present invention (4-state, N-tap predictor).
Figure 16B:
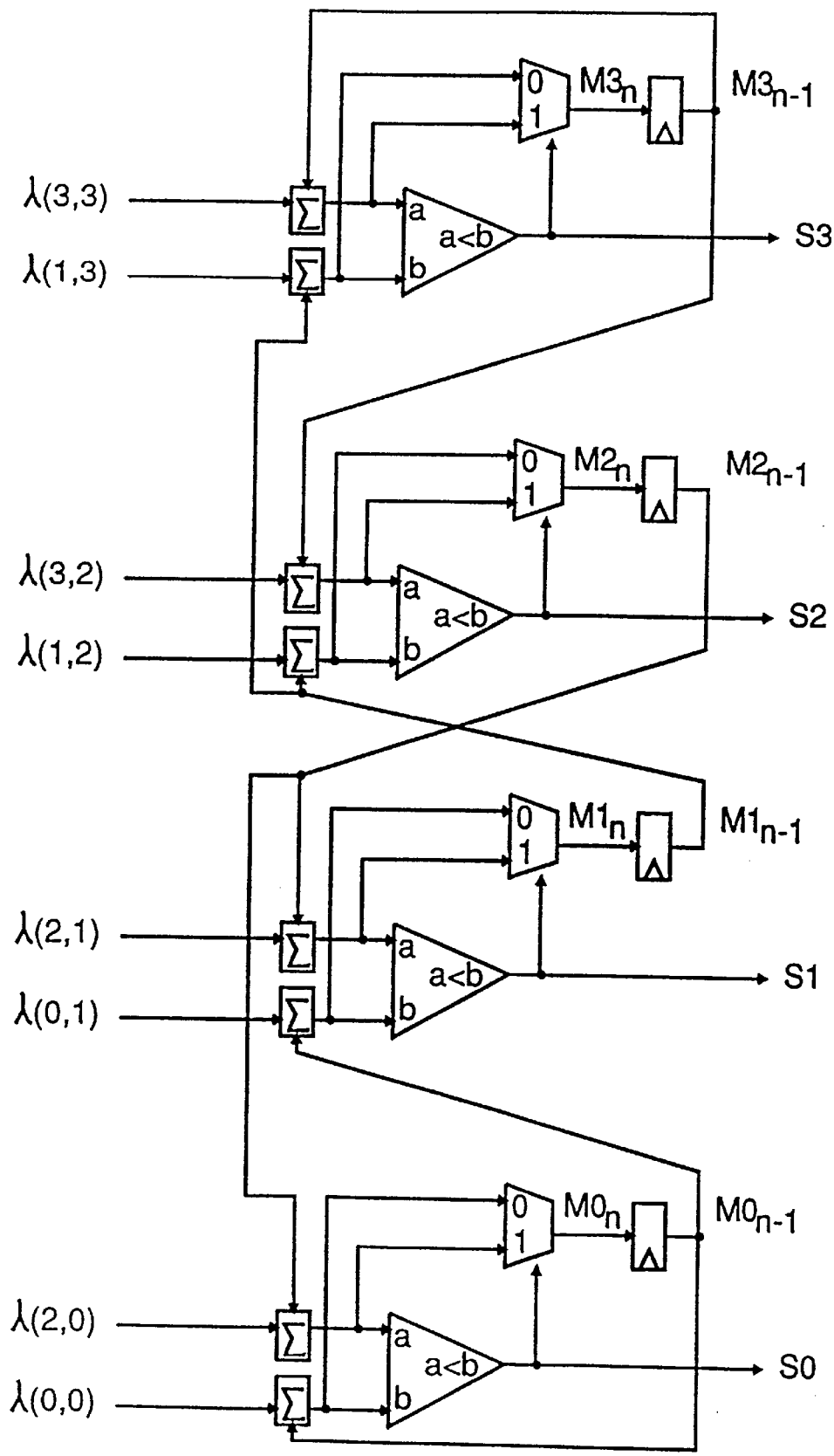
Figure 16C:
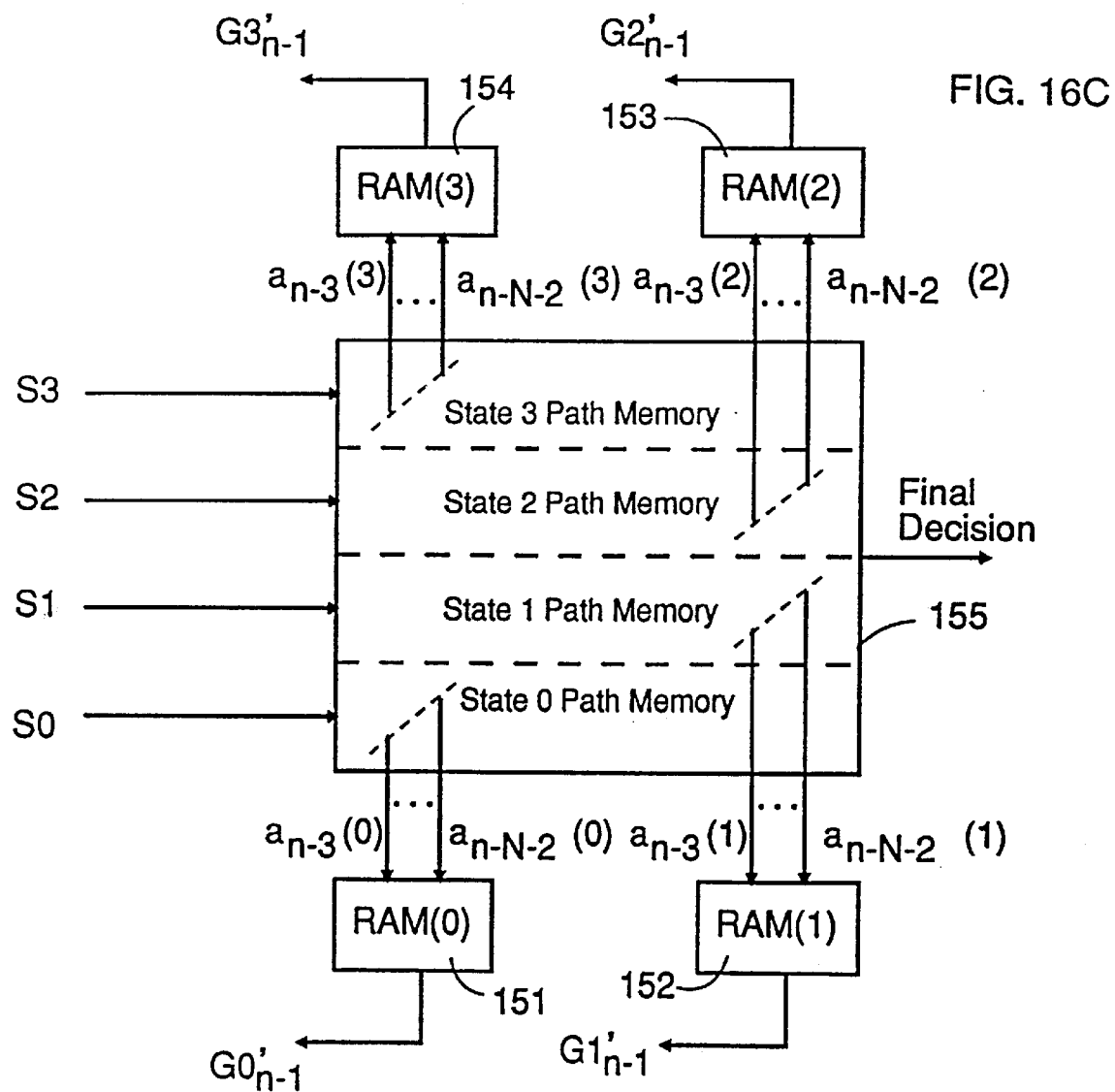

Letting $$G3'_{n-1} = g_1 + g_2 + \sum_{i=3}^{N+2} a_{n-i}(3)g_i, \quad (115)$$

$$G2'_{n-1} = g_1 - g_2 + \sum_{i=3}^{N+2} a_{n-i}(2)g_i, \quad (116)$$

$$G1'_{n-1} = -g_1 + g_2 + \sum_{i=3}^{N+2} a_{n-i}(1)g_i, \quad (117)$$

$$G0'_{n-1} = -g_1 - g_2 + \sum_{i=3}^{N+2} a_{n-i}(0)g_i, \quad (118)$$

one obtains the eight equivalent branch metrics $$\lambda(3,3)=|z_n+G3'_{n-1}-1|^2, \quad (119)$$

$$\lambda(3,2)=|z_n+G3'_{n-1}+1|^2, \quad (120)$$

$$\lambda(2,1)=|z_n+G2'_{n-1}-1|^2, \quad (121)$$

$$\lambda(2,0)=|z_n+G2'_{n-1}+1|^2, \quad (122)$$

$$\lambda(1,3)=|z_n+G1'_{n-1}-1|^2, \quad (123)$$

$$\lambda(1,2)=|z_n+G1'_{n-1}+1|^2, \quad (124)$$

$$\lambda(0,1)=|z_n+G0'_{n-1}-1|^2, \quad (125)$$

$$\lambda(0,0)=|z_n+G0'_{n-1}+1|^2, \quad (126)$$

where $z_n$ are the samples obtained from the corresponding N-tap prediction error filter connected in cascade with the equalizer (see FIG. 2C). By making use of the definitions $Z1_n = z_n - 1$ and $Z0_n = z_n + 1$, respectively, eqs. (119)–(126) can be written as $$\lambda(3,3)=|Z1_n+G3'_{n-1}|^2, \quad (127)$$

$$\lambda(3,2)=|Z0_n+G3'_{n-1}|^2, \quad (128)$$

$$\lambda(2,1)=|Z1_n+G2'_{n-1}|^2, \quad (129)$$

$$\lambda(2,1)=|Z0_n+G2'_{n-1}|^2, \quad (130)$$

$$\lambda(1,3)=|Z1_n+G1'_{n-1}|^2, \quad (131)$$

$$\lambda(1,2)=|Z0_n+G1'_{n-1}|^2, \quad (132)$$

$$\lambda(0,1)=|Z1_n+G0'_{n-1}|^2, \quad (133)$$

$$\lambda(0,0)=|Z0_n+G0'_{n-1}|^2, \quad (134)$$

respectively, yielding again the trellis diagram shown in FIG. 9. Direct mapping of this trellis into hardware functions—by using the new variables as defined above—leads to the structure shown in FIGS. 16A, 16B, 16C. The terms $G0'_{n-1}$, $G1'_{n-1}$, $G2'_{n-1}$, and $G3'_{n-1}$, defined by (115)–(118), respectively, can again be generated by means of RAMs 151–154 which can be loaded with the appropriate values depending on the chosen operating point of the channel; the 4-state SPM 155—assuming again a register-exchange structure—provides the N address bits for each of the four RAMs (one per state); equivalently, these four RAMs 151–154 can be combined into a single RAM structure with multiple inputs and outputs. Automatic metric bounding is achieved by using the conventional modulo-2 technique in the adders feeding the comparator inputs.

NPML Detectors Implemented by Analog VLSI Technology

Implementation of any detector included within the family of NPML detectors can be done in either digital, analog, or mixed digital/analog VLSI circuit technology. Implementations in analog technology are of particular interest in high data rate and/or low-power applications. An example for PRML is described in "Analog Implementation of Class-IV Partial-Response Viterbi Detector", A. H. Shakiba et al., Proc. ISCAS'94, 1994; similar methods can be applied to NPML detectors.

NPML Detectors with Reduced SPM Length

It was indicated above, that NPML detectors generally do not exhibit quasicatastrophic error propagation. This property can be exploited to save hardware and reduce decoding delay by reducing the length of the path memory in the Viterbi detector without compromising performance. On the other, these hardware savings may be traded for additional increases in recording density by using run-length limited (RLL) codes with a higher rate than 8/9, since the code constraints relating to the length of the SPM can be relaxed.

4-State, N-Tap Predictor NPML where N=2 or 4 (Alternative 2)

Letting in (119)–(126)

$$G33'_{n-1}=G3'^{n-1}-1 \quad (135)$$

$$G32'_{n-1}=G3'_{n-1}+1 \quad (136)$$

and so on, we can write the eight branch metrics as $$\lambda(3,3)=|z_n+G33'_{n-1}|^2, \quad (137)$$

$$\lambda(3,2)=|z_n+G32'_{n-1}|^2, \quad (138)$$

$$\lambda(2,1)=|z_n+G21'_{n-1}|^2, \quad (139)$$

$$\lambda(2,0)=|z_n+G20'_{n-1}|^2, \quad (140)$$

$$\lambda(1,3)=|z_n+G13'_{n-1}|^2, \quad (141)$$

$$\lambda(1,2)=|z_n+G12'_{n-1}|^2, \quad (142)$$

$$\lambda(0,1)=|z_n+G01'_{n-1}|^2, \quad (143)$$

$$\lambda(0,0)=|z_n+G00'_{n-1}|^2, \quad (144)$$

Figure 17A:
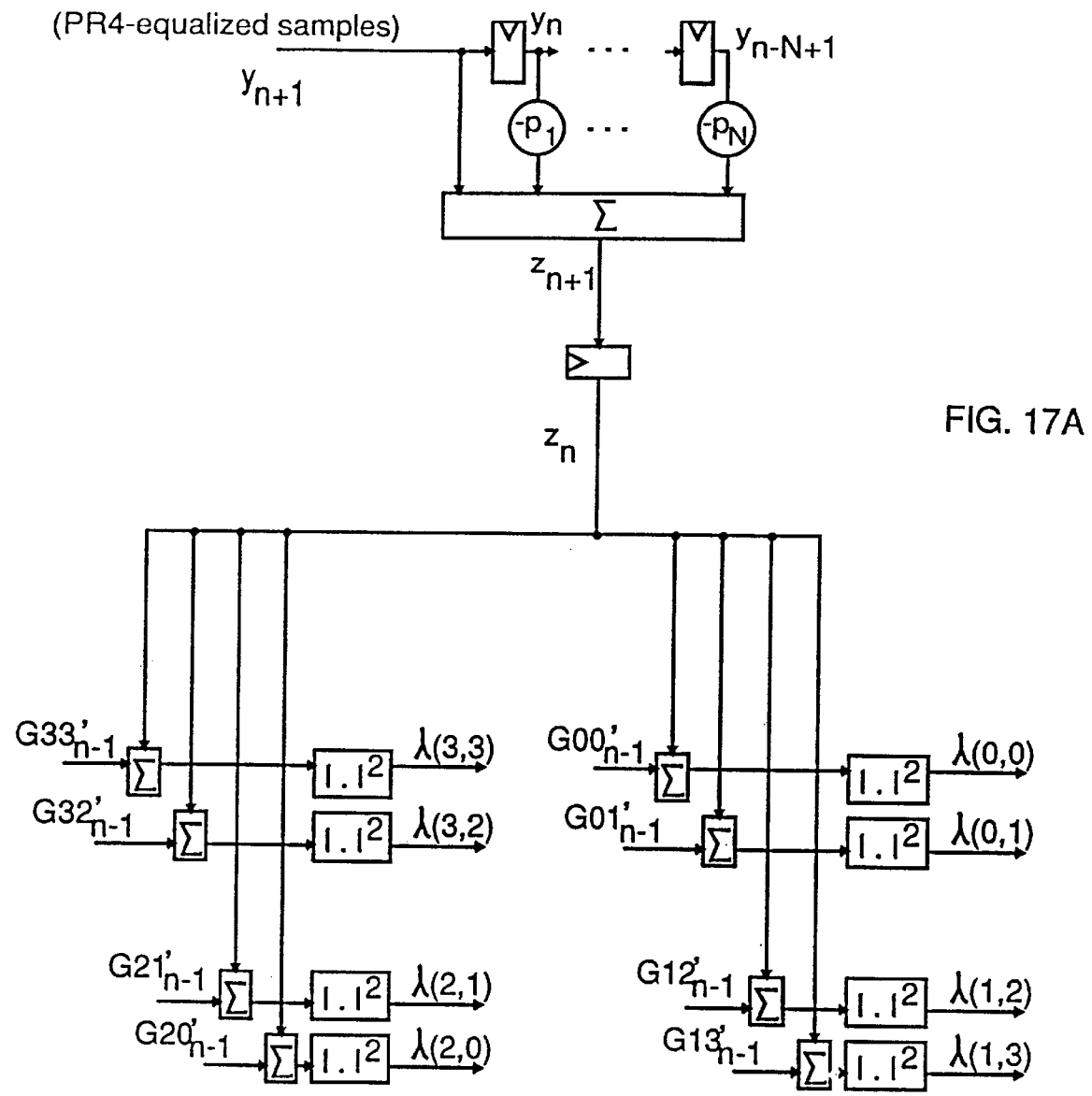
FIGS. 17A–17C Shows another implementation of an NPML detector, according to the present invention (4-state, N-tap predictor).
Figure 17B:
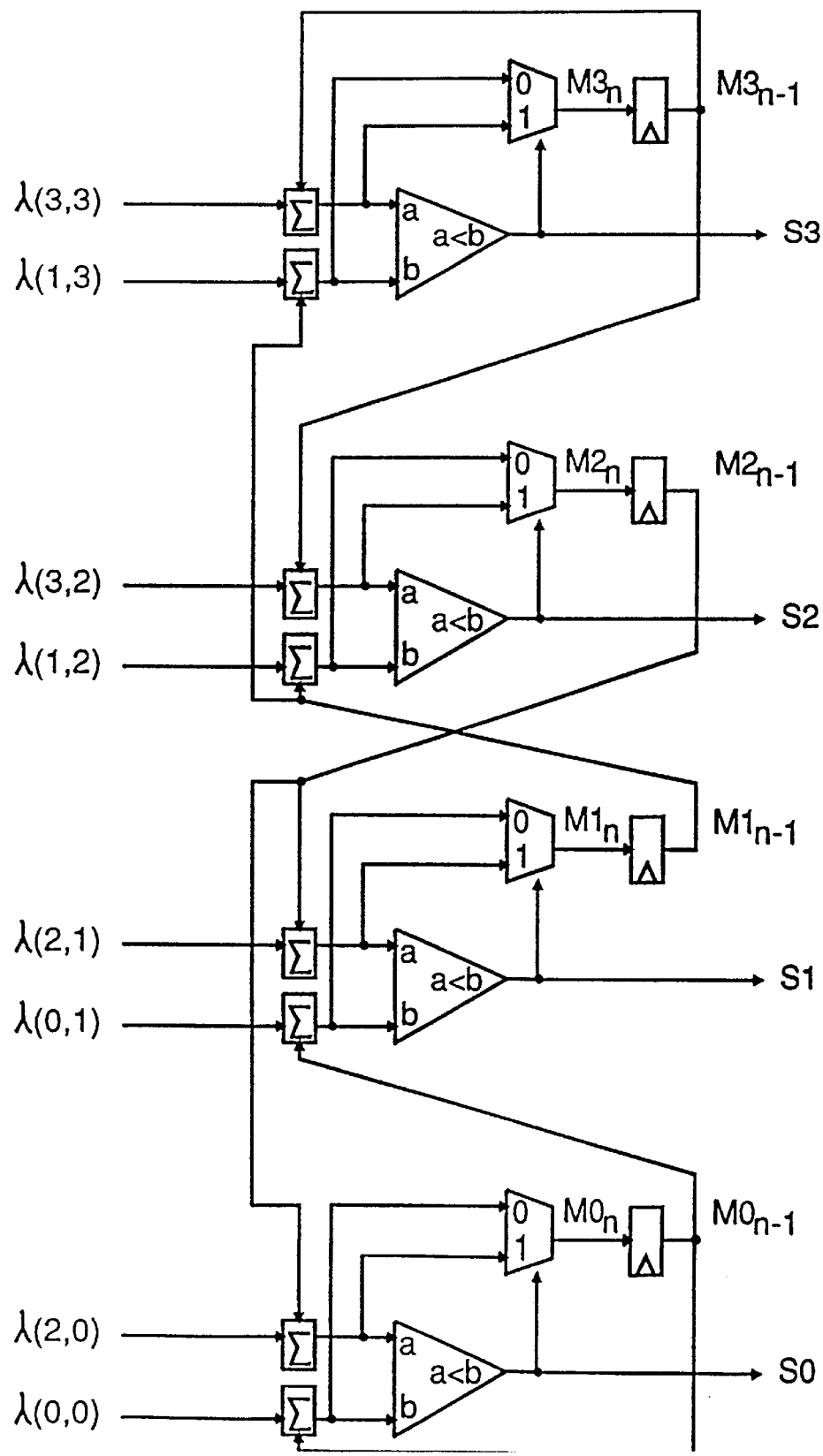
Figure 17C:
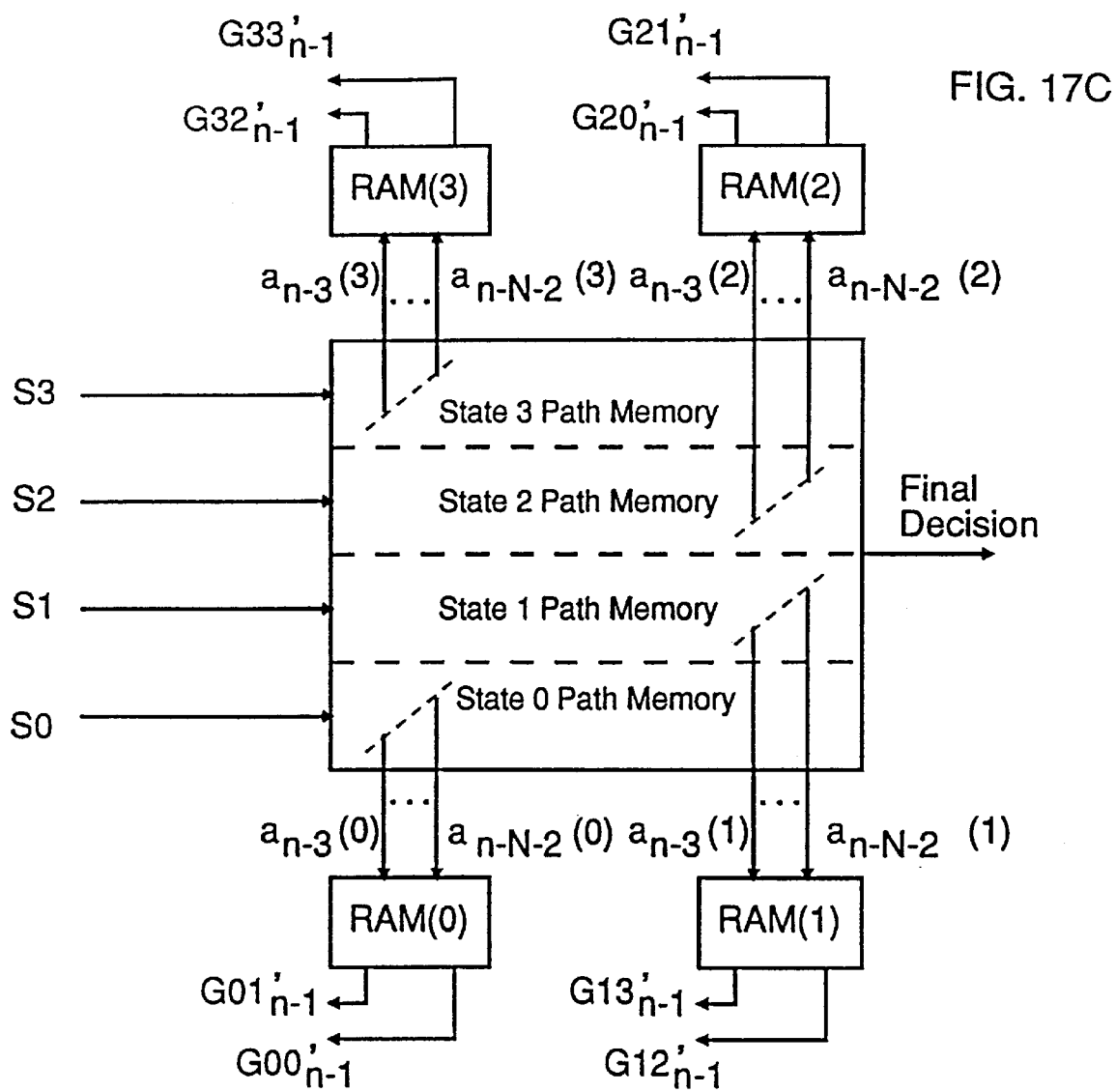

This version leads to the implementation shown in FIGS. 17A, 17B, 17C where the squaring function can be approximated as shown by A. Eshraghi et al., in "Design of a New Squaring Function for the Viterbi Algorithm", IEEE Journal of Solid State Circuits, Vol. 29, No. 9, September 1994, pp. 1102–1107.

We claim:

1. A detector comprising:
   a prediction error filter comprising a predictor having a length;
   a sequence detector, coupled to the prediction error filter, the sequence detector having a number of states; and
   a feedback filter, coupled to the sequence detector, having a length which is a function of the predictor length, the number of states of the sequence detector, and a length of a generalized partial response shaping polynomial.

2. The detector of claim 1, wherein
   the predictor has length N;
   the sequence detector has $2^K$ states; and
   the feedback filter has a length N+P−1, where P is the length of a generalized partial response shaping polynomial, and $0 \leq K \leq N+P$.

3. The detector of claim 2, wherein the feedback filter has a length of N+P−K for each state, and the sequence detector comprises a maximum likelihood sequence detector.

4. The detector of claim 1, wherein the feedback filter uses path history decisions.

5. The detector of claim 1, wherein the generalized partial response shaping polynomial is partial response class IV.

6. The detector of claim 1, wherein the feedback filter comprises a finite impulse response filter or a RAM.

7. The detector of claim 1, wherein the feedback filter comprises a RAM and the sequence detector comprises means for adaptively altering contents of the RAM.

8. The detector of claim 1, wherein the prediction error filter whitens a noise component of a signal.

9. The detector of claim 1, wherein the sequence detector further comprises a survivor path memory for storing path history decisions.

10. The detector of claim 9, wherein the feedback filter uses precomputed cancellation terms, and retrieves the cancellation terms by applying the path history decisions as addresses.

11. The detector of claim 1, wherein
    the prediction error filter whitens a noise component of a received signal sample having a generalized partial response signal component, and adds intersymbol-interference components;
    the sequence detector, further comprises a survivor path means for storing path history decisions; and
    the feedback filter cancels a portion of the intersymbol-interference components using precomputed intersymbol-interference cancellation terms by applying the path history decisions as addresses.

12. The detector of claim 1, wherein an output signal of the sequence detector is coupled to an inverse precoder.

13. The detector of claim 1, further comprising means for adaptive setting of a transfer characteristic of the prediction error filter.

14. The detector of claim 1, wherein the sequence detector comprises a memoryless detector.

15. The detector of claim 14, wherein the memoryless detector determines a nominal expected value, and further comprising:
    means for estimating a noise contribution in a plurality of signal samples by subtracting a value of a signal sample from the nominal expected value;
    means for predicting a noise contribution of a current signal sample using the estimated noise contribution;
    means for modifying the predicted noise contribution of the current signal sample; and
    means for feeding the output of the means for modifying to a partial response maximum likelihood detector.

16. A data storage device, comprising:
    means for reading encoded sequences of data; and
    a decoder comprising
      a prediction error filter comprising a predictor having a length,
      a sequence detector, coupled to the prediction error filter, the sequence detector having a number of states, and
      a feedback filter, coupled to the sequence detector, having a length which is a function of the predictor length, the number of states of the sequence detector, and a length of a generalized partial response shaping polynomial.

17. The data storage device of claim 16, wherein
    the predictor has length N;
    the sequence detector has $2^K$ states; and
    the feedback filter has a length N+P−K, where P is the length of a generalized partial response shaping polynomial, and $0 \leq K \leq N+P$.

18. The data storage device of claim 17, wherein the feedback filter has a length of N+P−K for each state.

19. The data storage device of claim 16, wherein the generalized partial response shaping polynomial is partial response class IV.

20. The data storage device of claim 16, wherein the sequence detector comprises a maximum likelihood sequence detector.

21. The data storage device of claim 16, wherein the feedback filter comprises a RAM or a finite impulse response filter.

22. The data storage device of claim 16, wherein the sequence detector comprises a survivor path memory for storing path history decisions, and the feedback filter uses precomputed and stored cancellation terms, and retrieves the cancellation terms by applying the path history decisions as addresses.

23. The data storage device of claim 16, wherein the prediction error filter whitens a noise component and adds intersymbol-interference components to a signal.

24. A method for symbol detection, comprising the steps of:

receiving a signal sample having a noise component;

filtering the signal sample using a prediction error filter having a length, the filtered signal having intersymbol-interference components; and determining a symbol using a sequence detector having a number of states, and also using a feedback filter, coupled to the sequence detector, having a length which is a function of the predictor length, the number of states of the sequence detector, and a length of a generalized partial response shaping polynomial.

25. The method of claim 24 wherein the prediction error filter has a length N;

the sequence detector has $2^K$ states; and the feedback filter has a length N+P−K, where P is a length of a generalized partial response shaping polynomial, and $0 \leq K \leq N+P$.

26. The method of claim 24, further comprising the step of canceling a portion of the intersymbol-interference components from the filtered signal using predetermined intersymbol-interference cancellation terms.

27. The method of claim 24, wherein the noise component of the received signal sample is filtered by whitening.

28. The method of claim 25, wherein the signal sample comprises a partial response signal component corrupted by a noise component; and the step of determining further comprises the step of performing a branch metric computation based on a $2^K$-State Viterbi algorithm to determine a most likely sequence corresponding to the signal sample.

29. The method of claim 24, further comprising the steps of:

storing path history decisions from a sequence detector in a memory;

retrieving pre-computed intersymbol-interference cancellation terms using the path history decisions as addresses to storage locations; and canceling intersymbol-interference components in the signal sample using the intersymbol-interference cancellation terms.

30. The method of claim 24, further comprising the steps of:

estimating a noise contribution in a plurality of past digital signal samples by subtracting a value of a signal sample from a nominal expected value, the nominal expected value being determined by memoryless detection;

using the noise contribution of the plurality of the past digital signal samples to predict a noise contribution of the signal sample; and subtracting the predicted noise contribution from the signal sample.

* * * * *